(12) United States Patent
Agematsu

(10) Patent No.: US 8,624,454 B2
(45) Date of Patent: Jan. 7, 2014

(54) COIL WOUND BODY AND MOTOR

(75) Inventor: Ikuo Agematsu, Nagano (JP)

(73) Assignee: Nidec Sankyo Corporation (JP)

(*) Notice: Subject to any disclaimer, the term of this patent is extended or adjusted under 35 U.S.C. 154(b) by 575 days.

(21) Appl. No.: 12/888,902

(22) Filed: Sep. 23, 2010

(65) Prior Publication Data
US 2011/0068653 A1    Mar. 24, 2011

(30) Foreign Application Priority Data

Sep. 24, 2009  (JP) ................................. 2009-219511

(51) Int. Cl.
*H02K 3/50* (2006.01)
*H02K 3/46* (2006.01)
*H02K 37/00* (2006.01)

(52) U.S. Cl.
USPC ........................... 310/71; 336/192; 310/49.13

(58) Field of Classification Search
USPC ............... 310/49.01, 49.13, 71, 179; 336/192
See application file for complete search history.

(56) References Cited

U.S. PATENT DOCUMENTS

| | | | | |
|---|---|---|---|---|
| 5,412,367 A * | 5/1995 | Shibui et al. | ................. | 336/192 |
| 6,046,519 A * | 4/2000 | Hanazumi et al. | ......... | 310/49.13 |
| 7,017,851 B2 * | 3/2006 | Matsuura et al. | ............. | 242/437 |
| 7,071,593 B2 * | 7/2006 | Matsushita et al. | ........... | 310/257 |
| 7,348,696 B2 * | 3/2008 | Sonohara et al. | .......... | 310/49.08 |
| 7,911,094 B2 * | 3/2011 | Yajima | ............................. | 310/71 |
| 7,990,000 B2 * | 8/2011 | Suzuki et al. | ................... | 310/71 |

FOREIGN PATENT DOCUMENTS

JP    2007-259543 A    10/2007

* cited by examiner

*Primary Examiner* — Burton Mullins
(74) *Attorney, Agent, or Firm* — Cantor Colburn LLP

(57) ABSTRACT

A coil wound body may include a coil bobbin around which a coil wire is wound. The coil bobbin may include a wound part around which the coil wire is wound, a terminal block part, a circuit board receiving face which is provided on the terminal block part and on which a wiring circuit board is disposed, and pin-shaped terminals. The coil bobbin is provided with a coil wire leading-out path reaching to root portions of the pin-shaped terminals from the wound part through an inner side of the circuit board receiving face. The coil wire are led out to the pin-shaped terminals by passing through the coil wire leading-out path without passing through a position overlapping with the outer side of the circuit board receiving face. The coil wound body is preferably applied to a motor.

24 Claims, 7 Drawing Sheets

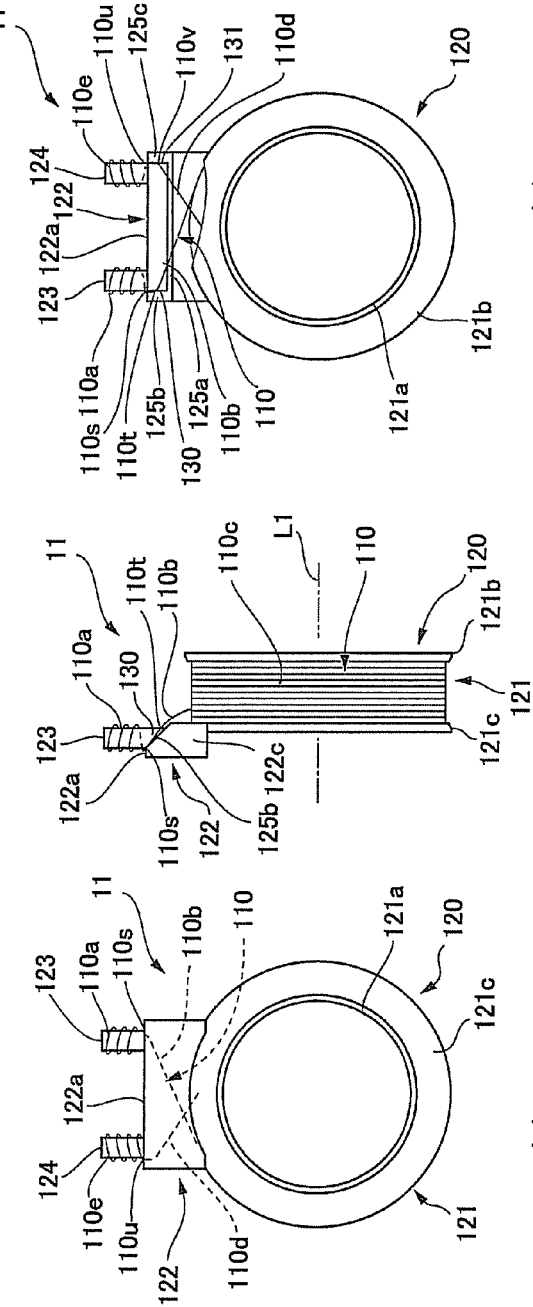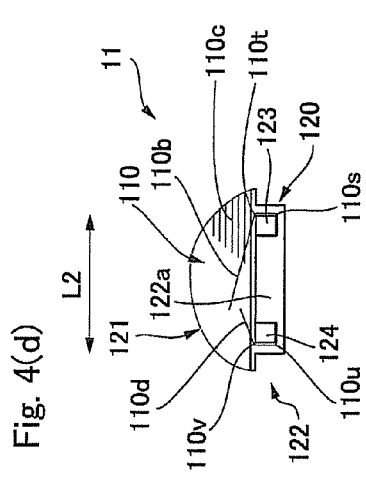

COIL WOUND BODY AND MOTOR

CROSS REFERENCE TO RELATED APPLICATION

The present invention claims priority under 35 U.S.C. §119 to Japanese Application No. 2009-219511 filed Sep. 24, 2009, the entire content of which is incorporated herein by reference.

FIELD OF THE INVENTION

At least an embodiment may relate to a coil wound body in which a coil wire is wound around a coil bobbin and a motor.

BACKGROUND

As shown in FIG. 7, a stator of a stepping motor commonly includes a coil wound body 1011 which is provided with a coil wire 1110 and a coil bobbin 1120. The coil bobbin 1120 includes a wound part 1121 where the coil wire 1110 is wound around, a terminal block part 1122 provided on an outer side in the radial direction of the wound part 1121, and pin-shaped terminals 1123 and 1124 which are stood up from the terminal block part 1122 to the outer side in the radial direction. End parts of the coil wire 1110 are bound around the pin terminals 1123 and 1124. An entire face directing to an outer side in the radial direction of the terminal block part 1122 is formed as a circuit board receiving face 1122a on which a wiring circuit board 1010 is disposed in an overlapped manner. The pin-shaped terminals 1123 and 1124 are stood up on the circuit board receiving face 1122a at inner positions of the edge. In the coil bobbin 1120 structured as described above, after the wiring circuit board 1010 is overlapped on the circuit board receiving face 1122a while the pin-shaped terminals 1123 and 1124 are inserted into through holes 1102 formed in the wiring circuit board 1010, the coil wire 1110 and the land parts of the wiring circuit board 1010 are soldered with each other in a state that the wiring circuit board 1010 is held in a stable attitude.

According to this structure, in lead-out parts 1110b and 1110d of the coil wire 1110 in the coil wound body 1011 which are led out from the winding part 1121 to the pin-shaped terminals 1123 and 1124, floated portions 1110x which are floated from the circuit board receiving face 1122a are formed between a corner portion 1122r located on the winding part 1121 side and the pin-shaped terminals 1123 and 1124 on the terminal block part 1122. Therefore, when the wiring circuit board 1010 is placed on the circuit board receiving face 1122a, the floated portions 1110x of the lead-out parts 1110b and 1110d are held between the wiring circuit board 1010 and the circuit board receiving face 1122a and thus the floated portions 1110x are pressed by the wiring circuit board 1010. As a result, the coil wire 1110 may be pulled and disconnected. In Japanese Patent Laid-Open No. 2007-259543, in order to prevent disconnection of a coil wire when the coil wire is wound around a coil bobbin, a structure has been proposed in which a cut-out groove for passing the coil wire is formed at a corner part of a terminal block part.

However, in the technique described in the above-mentioned Patent Literature, even when the cut-out groove is formed, floated portions of the coil wire from the circuit board receiving face are newly formed between another corner portion formed by the cut-out groove and the pin-shaped terminals and thus the problem described with reference to FIG. 7 is not eliminated.

SUMMARY

In view of the problems described above, at least an embodiment of the present invention may advantageously provide a coil wound body in which disconnection and damage of a coil wire are not easily occurred even when a wiring circuit board is disposed on a circuit board receiving face in an overlapped manner after the coil wire has been led out to the pin-shaped terminals which are stood up in a terminal block part having the circuit board receiving face, and a motor utilizing the coil wound body.

According to at least an embodiment of the present invention, there may be provided a coil wound body including a coil bobbin around which a coil wire is wound. The coil bobbin includes a wound part around which the coil wire is wound, a terminal block part which is protruded toward an outer side in a radial direction from the wound part, a circuit board receiving face which is located on the outer side in the radial direction of the terminal block part and on which a wiring circuit board is disposed in an overlapped manner, and pin-shaped terminals which are located on the outer side in the radial direction with respect to the circuit board receiving face and protruded toward the outer side in the radial direction. The coil wire includes a winding part which is wound around the wound part, lead-out parts which are led out from the winding part to contacted positions with the pin-shaped terminals, and binding parts which are located on tip end sides with respect to the lead-out parts and bound around the pin-shaped terminals. The coil bobbin is provided with a coil wire leading-out path which reaches to root portions of the pin-shaped terminals from the wound part through an inner side in the radial direction with respect to the circuit board receiving face. Further, the lead-out parts of the coil wire are led out to the contacted positions with the pin-shaped terminals by passing through the coil wire leading-out path without passing through a position overlapping with the outer side in the radial direction of the circuit board receiving face.

In at least an embodiment of the present invention, the "lead-out part" means a portion where the coil wire is not bound around the pin-shaped terminal, in other words, a portion from the winding part to a contacted position with the pin-shaped terminal.

In accordance with an embodiment of the present invention, the lead-out parts of the coil wire are led out to the contacted positions with the pin-shaped terminals by passing through the coil wire leading-out path without passing through a position overlapping with the outer side in the radial direction with respect to the circuit board receiving face. In other words, the coil wire is not located on the outer side in the radial direction of the circuit board receiving face between the wing part and the binding parts around the pin-shaped terminals and the lead-out parts of the coil wire are not passed over the circuit board receiving face. As a result, the coil wire is not floated from the circuit board receiving face and thus, even when the wiring circuit board is placed on the terminal block part, the coil wire is not pressed by the wiring circuit board. Therefore, disconnection or damage of the coil wire due to contacting of the coil wire with the wiring circuit board or due to that the coil wire is pulled by depression of the wiring circuit board can be prevented. Further, since the coil wire is not present on the circuit board receiving face, an inclination of the wiring circuit board due to the coil wire does not occur and the wiring circuit board is received by the circuit board receiving face in a face-contacted state. Therefore, the wiring circuit board is disposed in a stable state.

In accordance with an embodiment of the present invention, the pin-shaped terminals are provided on inner sides with respect to both end parts in a circumferential direction of the terminal block part, and the coil wire leading-out path is structured on an inner side in the circumferential direction with respect to the both end parts in the circumferential direction of the terminal block part. According to this structure, the lead-out parts of the coil wire are led out to the pin-shaped terminals without passing through the side faces in the circumferential direction of the terminal block part. Therefore, after the coil wire has been bound around the pin-shaped terminals, even when something is contacted with the side faces of the terminal block part, disconnection or damage of the coil wire can be prevented. Further, since the lead-out parts of the coil wire are not passed through the side faces in the circumferential direction of the terminal block part, even when both side end parts of the terminal block part are held by a hand for handling the coil wound body, the hand does not touch the coil wire and thus the coil wire is not disconnected. Therefore, the coil wound body is easily handled.

In accordance with an embodiment of the present invention, the lead-out part of the coil wire is led out from the winding part to the contacted position with the pin-shaped terminal in a not-slacked state. According to this structure, the lead-out part is passed through only a predetermined position of the coil bobbin and thus the lead-out position or the like is not displaced. Further, when the lead-out part of the coil wire is not slacked, the lead-out part is prevented from being sandwiched between the wiring circuit board and the circuit board receiving face and so on. In addition, the coil wire of the winding part is not loosened.

In accordance with an embodiment of the present invention, the coil wire leading-out path of the coil bobbin is structured so as to pass through a front side where the wound part is located with respect to the pin-shaped terminals, the front side of the terminal block part with respect to the pin-shaped terminals is formed to be a first inner side region which is located on the inner side in the radial direction with respect to the circuit board receiving face and structures the coil wire leading-out path, and a region which is adjacent in a circumferential direction to the pin-shaped terminal in an extending direction of the lead-out part from the wound part is formed to be a second inner side region which is located on the inner side in the radial direction with respect to the circuit board receiving face and structures the coil wire leading-out path. Specifically, it may be structured so that a front face of the pin-shaped terminal on a side where the wound part is located is formed with a wall face in the terminal block part so as to extend toward the wound part side from the circuit board receiving face and so as to continuously form the same face on the inner side in the radial direction as the front face of the root portion of the pin-shaped terminal and, in the terminal block part, a front space of the wall face is formed to be the first inner side region which is located on the inner side in the radial direction with respect to the circuit board receiving face and structures the coil wire leading-out path. Further, it may be structured so that a wall face is formed so as to continuously form the same face on the inner side in the radial direction as a side face of the root portion of the pin-shaped terminal in at least one of both sides of the terminal block part which are adjacent in the circumferential direction to the pin-shaped terminal, and the wall face forms the second inner side region which is located on the inner side in the radial direction with respect to the circuit board receiving face and structures the coil wire leading-out path. According to this structure, the lead-out part of the coil wire is led out without passing through the position overlapping with the outer side in the radial direction with respect to the circuit board receiving face and connected with the contacted position on the front side or one of both sides of the pin-shaped terminal. Also in this case, since the lead-out parts of the coil wire are not passed over the circuit board receiving face, the lead-out parts are not floated from the circuit board receiving face. Therefore, when the wiring circuit board is placed on the terminal block part, disconnection and damage due to depressing of the wiring circuit board can be prevented.

In accordance with an embodiment of the present invention, a front face of the pin-shaped terminal where the wound part is located is extended toward a wound part side with respect to the circuit board receiving face so that a wall face is formed so as to be continuously connected with a front face of a root portion of the pin-shaped terminal, and a front space of the wall face is formed to be the first inner side region, the terminal block is formed with a wall face which is continuously connected with a side face of the root portion of the pin-shaped terminal in a region adjacent to the pin-shaped terminal in the extending direction of the lead-out part from the wound part, and the wall face is formed to be the second inner side region, and the lead-out part is contacted with a corner portion between the wall face in the first inner side region and the wall face in the second inner side region, and a tip end part of the lead-out part is contacted with an edge on a rear face side of the root portion of a side face of the pin-shaped terminal and bound around the pin-shaped terminal. According to this structure, the tip end part of the lead-out part is bound around the pin-shaped terminal from the same height as the circuit board receiving face and thus, the coil wire is bound around from the root portion of the pin-shaped terminal while preventing disconnection and damage due to depressing of the wiring circuit board when the wiring circuit board is placed on the terminal block part.

In accordance with an embodiment of the present invention, the coil bobbin is provided with a flange part whose diameter is enlarged at an end part of a body part of the wound part, and the lead-out part is contacted with a corner portion between an upper end part of a front face wall part which is continuously formed from the flange part toward the outer side in the radial direction and the wall face of the first inner side region.

In accordance with an embodiment of the present invention, the region which is adjacent in the circumferential direction to the pin-shaped terminal in the extending direction of the lead-out part from the wound part is formed to be an inclined face part which is inclined toward the wound part to structure the second inner side region. In this case, it is preferable that the inclined face part is inclined toward the winding part from a position adjacent in the circumferential direction to a rear face of the pin-shaped terminal which is located on an opposite side to the winding part side. According to this structure, the lead-out part is easily passed through the second inner side region.

In accordance with an embodiment of the present invention, the coil wire leading-out path of the coil bobbin is structured so as to pass through a front side where the wound part is located with respect to the pin-shaped terminal, and the front side where the wound part is located with respect to the pin-shaped terminal is formed to be an inner side region which is located on the inner side in the radial direction with respect to the circuit board receiving face and structures the coil wire leading-out path. According to this structure, the lead-out part of the coil wire is led out without passing through the position overlapping with the outer side in the radial direction with respect to the circuit board receiving face and is connected with the front side of the pin-shaped terminal. Further, also in this structure, since the lead-out parts of the coil wire are not passed over the circuit board receiving face, the lead-out parts are not floated from the circuit board receiving face. Therefore, when the wiring circuit board is placed on the terminal block part, disconnection and damage due to depressing of the wiring circuit board is prevented. In addition, since the coil wire leading-out path can be structured only on the front side of the pin-shaped terminal, an area of the circuit board receiving face in the terminal block part can be widely secured. Therefore, the wiring circuit board is received in a stable state.

In accordance with an embodiment of the present invention, the coil wire leading-out path of the coil bobbin is structured so as to pass through a region which is adjacent in a circumferential direction to the pin-shaped terminal on an opposite side to an extending direction of the lead-out part from the wound part and, in the terminal block part, the region and a front side region on the wound part side with respect to the region are formed to be an inner side region which is located on the inner side in the radial direction with respect to the circuit board receiving face and structures the coil wire leading-out path. According to this structure, the lead-out part of the coil wire is led out without passing through the position overlapping with the outer side in the radial direction with respect to the circuit board receiving face and is connected with the pin-shaped terminal. Also in this structure, since the lead-out parts of the coil wire are not passed over the circuit board receiving face, the lead-out parts are not floated from the circuit board receiving face. Therefore, when the wiring circuit board is placed on the terminal block part, disconnection and damage due to depressing of the wiring circuit board can be prevented.

In this case, it is preferable that the region which is adjacent to the pin-shaped terminal on the opposite side to the extending direction of the lead-out part from the wound part is formed to be an inclined face part which is inclined toward the wound part to structure the inner side region. According to this structure, the lead-out part is easily passed through the second inner side region.

In this case, it is preferable that the inclined face part is inclined toward the winding part from a position adjacent in the circumferential direction to a rear face of the pin-shaped terminal which is located on an opposite side to the winding part side. According to this structure, the lead-out part can be led out along the inclined face part and thus the lead-out part is guided to the pin-shaped terminal in a stable state. Further, since the lead-out part can be led out along the inclined face part, an unnecessary floating is hard to occur in the lead-out part. Therefore, a problem can be prevented in which the lead-out part is caught by something to cause the coil wire to be disconnected.

In accordance with an embodiment of the present invention, the pin-shaped terminals and the terminal block part are integrally formed of resin. According to this structure, different from a case that pin-shaped terminals formed of separated members from the terminal block part are used, even when the terminal block part is designed in any shape in order to prevent disconnection of the coil wire, a problem that the pin-shaped terminals are detached from the terminal block part does not occur.

The coil wound body to which at least an embodiment of the present invention is applied is applied to a motor which includes a stator provided with the coil wound body and a rotor provided with a rotor magnet.

Other features and advantages will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4(a) is a rear view showing a coil wound body used in a motor in accordance with the first embodiment of the present invention which is viewed from an opposite-to-output side of the motor, FIG. 4(b) is its side view, FIG. 4(c) is its front view which is viewed from an output side of the motor, and FIG. 4(d) is a plan view showing a terminal block part.

DETAILED DESCRIPTION OF PREFERRED EMBODIMENTS

A coil wound body and a stepping motor will be described below with reference to the accompanying drawings. In the following description, an output side of a rotation shaft is a front side and its opposite-to-output side is a rear side. Further, in the description of a terminal block part, a direction where pin-shaped terminals are protruded is a higher direction and a side of the coil bobbin where the winding part is located is described as a lower side.

First Embodiment

Figure 1:
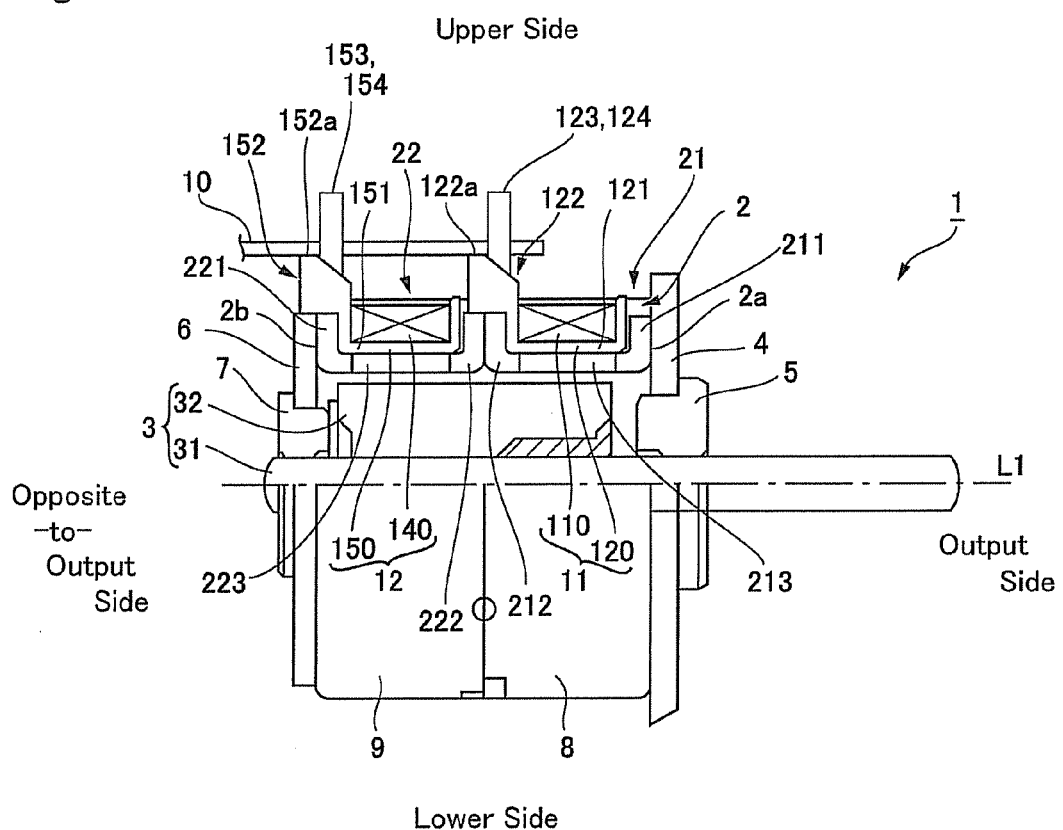
FIG. 1 is a side view showing a motor in accordance with a first embodiment of the present invention, a part of which is cut off.

FIG. 1 is a side view showing a motor in accordance with a first embodiment of the present invention, a part of which is cut off. A motor 1 in the first embodiment is a stepping motor, which includes a stator 2 formed in a cylindrical shape and a rotor 3 which is disposed on an inner peripheral side of the stator 2. The rotor 3 includes a rotation shaft 31 and a rotor magnet 32 which is formed in a cylindrical shape and coaxially attached to an outer peripheral face of the rotation shaft 31. A first end plate 4 is fixed to an end face 2a on the output side of the stator 2 and the first end plate 4 holds a first bearing 5 which rotatably supports the rotation shaft 31 around the axial line "L1". An end face 2b on the opposite-to-output side of the stator 2 is fixed with a second end plate 6, which holds a second bearing 7 rotatably supporting the rotation shaft 31 around the axial line "L1".

The stator 2 includes a first stator assembly 21 and a second stator assembly 22 which are disposed in a front and rear direction along the axial line "L1" of the rotation shaft 31. The first stator assembly 21 includes a first coil wound body 11 where a coil wire 110 is wound around a coil bobbin 120, and a ring-shaped outer stator core 211 and a ring-shaped inner stator core 212 on both sides in the axial line "L1" direction with respect to the first coil wound body 11. Each of the outer stator core 211 and the inner stator core 212 is formed of a magnetic metal member, which forms a magnetic path. Each of the outer stator core 211 and the inner stator core 212 is provided with pole teeth 213 which are stood up from its inner circumferential edge. The pole teeth 213 of the outer stator core 211 and the pole teeth 213 of the inner stator core 212 are alternately juxtaposed on the inner peripheral side of the first coil wound body 11 in the circumferential direction so as to face the outer peripheral face of the rotor magnet 32. The second stator assembly 22 also includes, similarly to the first stator assembly 21, a second coil wound body 12 where a coil wire 140 is wound around a coil bobbin 150, and a ring-shaped outer stator core 221 and a ring-shaped inner stator core 222 on both sides in the axial line "L1" direction with respect to the second coil wound body 12. Each of the outer stator core 221 and the inner stator core 222 is formed of a magnetic metal member, which forms a magnetic path. Each of the outer stator core 221 and the inner stator core 222 is provided with pole teeth 223 which are stood up from its inner circumferential edge. The pole teeth 223 of the outer stator core 221 and the pole teeth 223 of the inner stator core 222 are alternately juxtaposed on the inner peripheral side of the second coil wound body 12 in the circumferential direction so as to face the outer peripheral face of the rotor magnet 32. In this embodiment, outer circumferential edges of the outer stator cores 211 and 221 are respectively bent toward the axial line "L1" direction and the bent portions are formed as cases 8 and 9 which cover the coil wires 110 and 140.

The first coil wound body 11 includes a coil bobbin 120 and a coil wire 110 which is wound around the coil bobbin 120. The coil bobbin 120 is provided with a wound part 121 around which the coil wire 110 is wound, a terminal block part 122 which is protruded from the wound part 121 to an outer side in a radial direction (upward), and two pin-shaped terminals (a first pin-shaped terminal 123 and a second pin-shaped terminal 124) which are stood up from the terminal block part 122 to an outer side in the radial direction (upward). A face of the terminal block part 122 facing the outer side in the radial direction is a circuit board receiving face 122a on which a wiring circuit board 10 is disposed in an overlapped manner. The terminal block part 122, the first pin-shaped terminal 123 and the second pin-shaped terminal 124 are protruded from an opening of the case 8 to the outer side in the radial direction.

The second coil wound body 12 includes, similarly to the first coil wound body 11, a coil bobbin 150 and a coil wire 140 which is wound around the coil bobbin 150. The coil bobbin 150 is provided with a wound part 151 around which the coil wire 140 is wound, a terminal block part 152 which is protruded from the wound part 151 to an outer side in a radial direction (upward), and two pin-shaped terminals (a first pin-shaped terminal 153 and a second pin-shaped terminal 154) which are stood up from the terminal block part 152 to an outer side in the radial direction (upward). A face of the terminal block part 152 facing the outer side in the radial direction is a circuit board receiving face 152a on which the wiring circuit board 10 is disposed in an overlapped manner. The terminal block part 152, the first pin-shaped terminal 153 and the second pin-shaped terminal 154 are protruded from an opening of the case 9 to the outer side in the radial direction.

In the motor 1 structured as described above, an electrical power is supplied to the coil wires 110 and 140 through the wiring circuit board 10 to drive and control rotation of the rotor 3 by controlling the electric current. A rigid circuit board or a flexible circuit board may be used as the wiring circuit board 10 but, in this embodiment, a flexible circuit board is used as the wiring circuit board 10.

Figure 2:
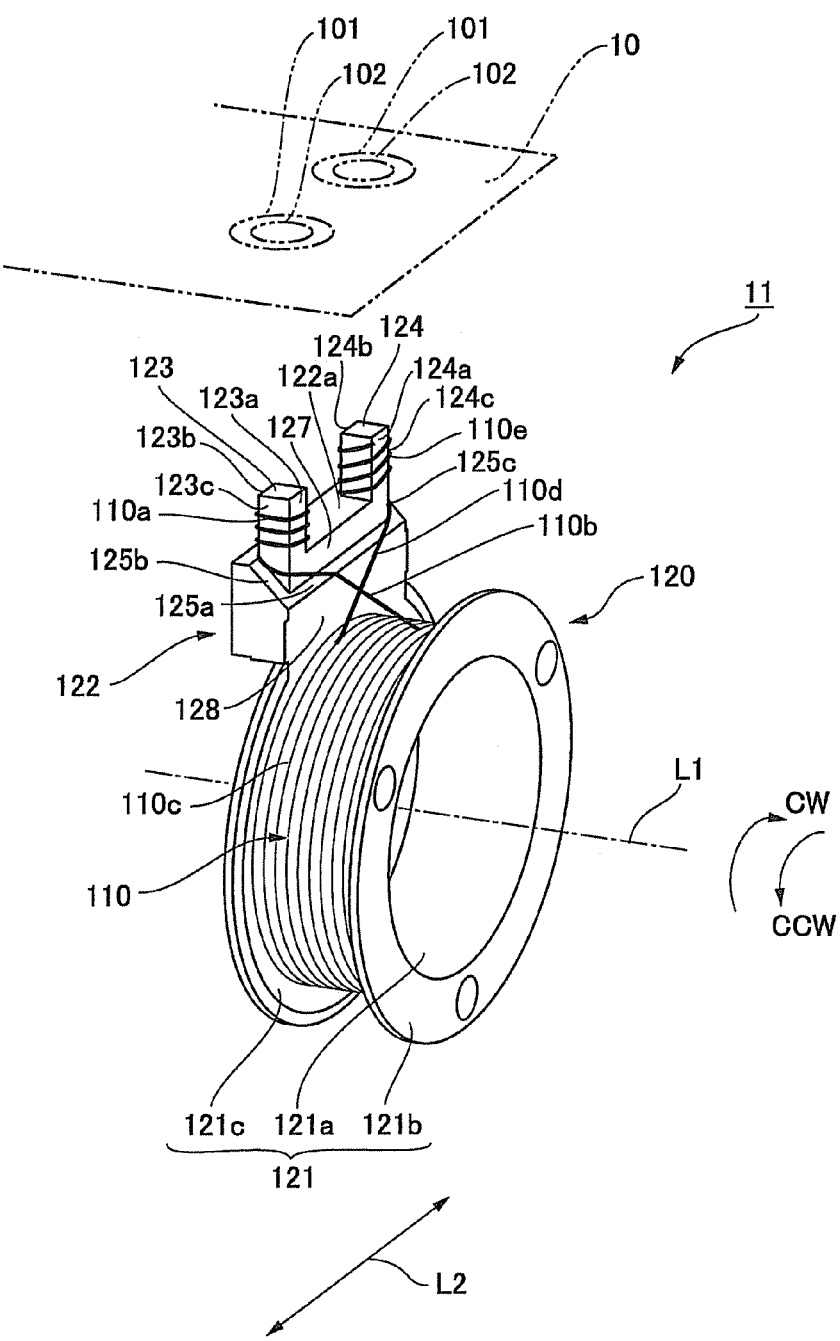
FIG. 2 is a perspective view showing a coil wound body which is used in a motor in accordance with the first embodiment of the present invention.
Figure 3:
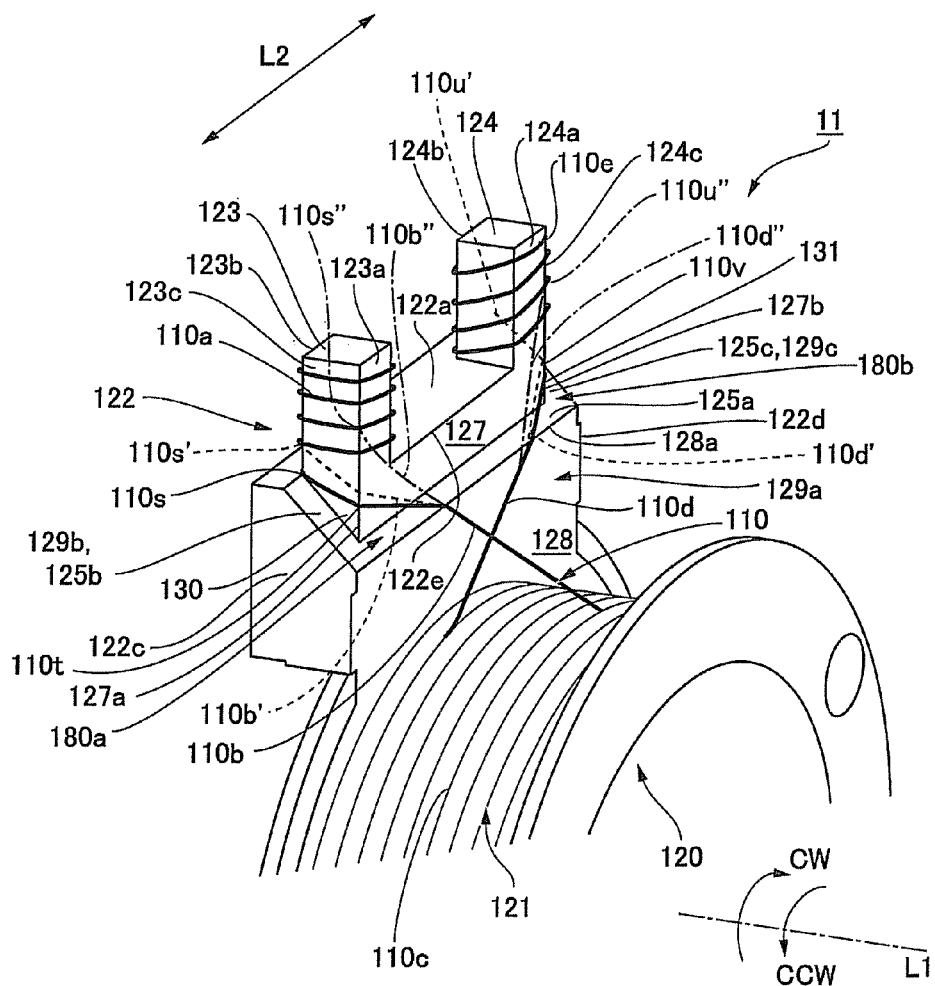
FIG. 3 is an enlarged perspective view showing a terminal block part of a coil wound body which is used in a motor in accordance with the first embodiment of the present invention.

FIG. 2 is a perspective view showing the coil wound body which is used in a motor in accordance with the first embodiment of the present invention. FIG. 3 is an enlarged perspective view showing the terminal block part of the coil wound body which is used in the motor in accordance with the first embodiment of the present invention. FIG. 4(a) is a rear view showing the coil wound body used in the motor in accordance with the first embodiment of the present invention which is viewed from the opposite-to-output side of the motor, FIG. 4(b) is its side view, FIG. 4(c) is its front view which is viewed from the output side of the motor, and FIG. 4(d) is a plan view showing the terminal block part. In this embodiment, the first coil wound body 11 and the second coil wound body 12 are provided with the same structure as each other and thus only the first coil wound body 11 will be described below and description of the second coil wound body 12 is omitted.

As shown in FIGS. 2 and 3 and FIGS. 4(a) through 4(d), the coil bobbin 120 of the first coil wound body 11 is provided with the wound part 121 around which the coil wire 110 is wound. The wound part 121 is provided with a body part 121a in a cylindrical shape, a ring-shaped front side flange part 121b whose diameter is enlarged at an end part on the output side of the body part 121a (front end part), and a ring-shaped rear side flange part 121c whose diameter is enlarged at an end part on the opposite-to-output side of the body part 121a (rear end part). In the wound part 121 described above, the coil wire 110 is wound around the body part 121a in a region sandwiched by the front side flange part 121b and the rear side flange part 121c. At an outer circumferential edge of the rear side flange part 121c of the coil bobbin 120, the terminal block part 122 having a large thickness is formed so as to protrude toward the outer side in the radial direction from a part in the circumferential direction of the rear side flange part 121c to form the terminal block part 122. The terminal block part 122 is formed in a shape protruded to the outer side in the radial direction from the wound part 121.

A face directing to the outer side of the most outer portion in the radial direction of the terminal block part 122 is formed as the circuit board receiving face 122a on which the wiring circuit board 10 is disposed in an overlapped manner. The wiring circuit board 10 is formed with a pair of land parts 101 and a through hole 102 is formed at the center of the land part 101. The terminal block part 122 is formed with the first pin-shaped terminal 123 and the second pin-shaped terminal 124 which are located on the outer side in the radial direction with respect to the circuit board receiving face 122a and protruded to the outer side in the radial direction. The first pin-shaped terminal 123 and the second pin-shaped terminal 124 are made of resin and integrally formed with the terminal block part 122 when the coil bobbin 120 is molded by using resin. In other words, the coil bobbin 120 is a resin molded product in which the wound part 121, the terminal block part 122, the first pin-shaped terminal 123 and the second pin-shaped terminal 124 are integrally molded by using resin.

The coil wire 110 is provided with a winding part 110c which is wound around the wound part 121, a first lead-out part 110b which is led to the first pin-shaped terminal 123 from the winding part 110c, and a first binding part 110a which is bound around the first pin-shaped terminal 123 on a tip end side with respect to the first lead-out part 110b. The first lead-out part 110*b* is led out in a no-slackened state from the winding part 110*c* which is wound around the wound part 121 and bound around the first pin-shaped terminal 123. Further, the coil wire 110 is provided with a second lead-out part 110*d* which is led to the second pin-shaped terminal 124 from the winding part 110*c* and a second binding part 110*e* which is bound around the second pin-shaped terminal 124 on a tip end side with respect to the second lead-out part 110*d*. The second lead-out part 110*d* is led out in a no-slackened state from the winding part 110*c* which is wound around the wound part 121 and bound around the second pin-shaped terminal 124.

In this embodiment, the binding part (the first binding part 110*a* and the second binding part 110*e*) is a portion where the coil wire 110 is wound around a side face of the pin-shaped terminal (the first pin-shaped terminal 123 and the second pin-shaped terminal 124). Further, the lead-out part (the first lead-out part 110*b* and the second lead-out part 110*d*) is a portion ranging from the wound part 121 to a contacted position where the coil wire 110 is contacted with the side face of the pin-shaped terminal (the first pin-shaped terminal 123 and the second pin-shaped terminal 124). Further, in the coil wire 110, a side of the second binding part 110*e* and the second lead-out part 110*d* is a winding start side when the coil wire 110 is wound around the coil bobbin 120, and a side of the first binding part 110*a* and the first lead-out part 110*b* is a winding end side when the coil wire 110 is wound around the coil bobbin 120.

As shown in FIG. 3, in the first coil wound body 11 in this embodiment, when viewed from a side in an axial line "L1", the terminal block part 122 of the coil bobbin 120 is formed in a rectangular block shape whose length in a circumferential direction of the coil bobbin 120 (right and left direction "L2") is longer, and both of the first pin-shaped terminal 123 and the second pin-shaped terminal 124 are stood up at inner side positions from side end parts 122*c* and 122*d* in the circumferential direction of the terminal block part 122. Further, the first pin-shaped terminal 123 and the second pin-shaped terminal 124 are stood up at separated positions in the circumferential direction. Further, the first pin-shaped terminal 123 and the second pin-shaped terminal 124 are provided at substantially center positions in the axial line "L1" direction on the outer side end part in the radial direction of the terminal block part 122.

In the terminal block part 122, an upper end part of a front face wall part 128 which is continuously stood up from the rear side flange part 121*c* to the outer side in the radial direction (upper side) is formed with an inclined face part 125*a* which is inclined obliquely downward toward the wound part 121 side. The inclined face part 125*a* is formed so as to cut off the front side of the first pin-shaped terminal 123 and the second pin-shaped terminal 124 of the terminal block part 122. Further, the inclined face part 125*a* is extended toward the wound part 121 with respect to the circuit board receiving face 122*a* from under positions of front faces 123*a* and 124*a* of the first pin-shaped terminal 123 and the second pin-shaped terminal 124 on the side where the wound part 121 is located. A wall face 127 is formed upward from a rear end edge of the inclined face part 125*a* so as to be continuously connected to root portions of the front faces 123*a* and 124*a* of the first pin-shaped terminal 123 and the second pin-shaped terminal 124. The wall face 127 is formed in the terminal block part 122 on the inner side in the radial direction with respect to the circuit board receiving face 122*a* so as to continuously form the same flat face as the front faces 123*a* and 124*a* of the root portions of the first pin-shaped terminal 123 and the second pin-shaped terminal 124. Therefore, a front side of the first pin-shaped terminal 123 and the second pin-shaped terminal 124 is formed as a first inner side region 129*a* which is comprised of a front space to the wall face 127, a front space to the inclined face part 125*a*, and a front space to the front face wall part 128. The first inner side region 129*a* is located on the inner side in the radial direction (lower side) with respect to the first pin-shaped terminal 123, the second pin-shaped terminal 124 and the circuit board receiving face 122*a*. In other words, in a state that the wiring circuit board 10 is disposed on the circuit board receiving face 122*a* formed on the terminal block part 122 and the first pin-shaped terminal 123 and the second pin-shaped terminal 124 are penetrated through the through holes 102 of the land parts 101 formed in the wiring circuit board 10, the first inner side region 129*a* is formed at the inner side position in the radial direction with respect to the root portions of the first pin-shaped terminal 123 and the second pin-shaped terminal 124 and with respect to the circuit board receiving face 122*a* on which the wiring circuit board 10 is disposed.

Further, one of both side regions adjacent to the first pin-shaped terminal 123 in the circumferential direction in the terminal block part 122, which is the region located in an extending direction of the first lead-out part 110*b* from the winding part 110*c* (counter-clockwise direction; CCW) is formed to be an inclined face part 125*b* which is inclined toward the wound part 121. The inclined face part 125*b* is formed so as to cut off one side of the terminal block part 122 with respect to the first pin-shaped terminal 123 and the inclined face part 125*b* structures a second inner side region 129*b* which is located on the inner side in the radial direction (lower side) with respect to the circuit board receiving face 122*a*. In other words, in a state that the wiring circuit board 10 is disposed on the circuit board receiving face 122*a* formed on the terminal block part 122 and the first pin-shaped terminal 123 is penetrated through the through hole 102 of the land part 101 formed in the wiring circuit board 10, the second inner side region 129*b* is formed at the inner side position in the radial direction with respect to the root portion of the first pin-shaped terminal 123 and with respect to the circuit board receiving face 122*a*. In this embodiment, the inclined face part 125*b* is inclined toward the wound part 121 from a position which is adjacent in the circumferential direction to a rear face 123*b* of the first pin-shaped terminal 123 located on an opposite side to the wound part 121. Further, a wall face 130 is formed on an upper portion from an edge on the first pin-shaped terminal 123 side of the inclined face part 125*b* so as to be continuously connected to the side face 123*c* of the root portions of the first pin-shaped terminal 123. The wall face 130 is formed in the terminal block part 122 on the inner side in the radial direction with respect to the circuit board receiving face 122*a* so as to continuously form the same flat face as the side face 123*c* of the root portion of the first pin-shaped terminal 123.

Further, one of both side regions adjacent to the second pin-shaped terminal 124 in the circumferential direction in the terminal block part 122, which is the region located in an extending direction of the second lead-out part 110*d* from the winding part 110*c* (clockwise direction; CW) is formed to be an inclined face part 125*c* which is inclined toward the wound part 121. The inclined face part 125*c* is formed so as to cut off the other side of the terminal block part 122 with respect to the second pin-shaped terminal 124 and the inclined face part 125*c* structures a second inner side region 129*c* which is located on the inner side in the radial direction (lower side) with respect to the circuit board receiving face 122*a*. In other words, in a state that the wiring circuit board 10 is disposed on the circuit board receiving face 122*a* and the second pin-shaped terminal 124 is penetrated through the through hole 102 of the wiring circuit board 10, the second inner side region 129c is formed at the inner side position in the radial direction with respect to the root portion of the second pin-shaped terminal 124 and with respect to the circuit board receiving face 122a on which the wiring circuit board 10 is disposed. In this embodiment, the inclined face part 125c is inclined toward the wound part 121 from a position which is adjacent in the circumferential direction to a rear face 124b of the second pin-shaped terminal 124 located on an opposite side to the wound part 121. Further, a wall face 131 is formed on an upper portion from an edge on the second pin-shaped terminal 124 side of the inclined face part 125c so as to be continuously connected to the side face 124c of the root portions of the second pin-shaped terminal 124. The wall face 131 is formed in the terminal block part 122 on the inner side in the radial direction with respect to the circuit board receiving face 122a so as to continuously form the same flat face as the side face 124c of the root portion of the second pin-shaped terminal 124. In addition, lower sides of the inclined face parts 125b and 125c are connected with the inclined face part 125a and the inclined face parts 125a, 125b and 125c structure a continuous inclined face part.

In the terminal block part 122 of the coil bobbin 120 structured as described above, a flat face is formed only in a region which is sandwiched by the first pin-shaped terminal 123 and the second pin-shaped terminal 124, regions on opposite sides to the sides where the wound part 121 is located with respect to the first pin-shaped terminal 123 and the second pin-shaped terminal 124, and regions on opposite sides to the sides where the wound part 121 is located with respect to the inclined face parts 125b and 125c. The flat face is the circuit board receiving face 122a.

In this embodiment, the first lead-out part 110b of the coil wire 110 is extended in a counter-clockwise CCW direction from the winding part 110c and the coil wire 110 is bound around the first pin-shaped terminal 123 by passing through the counter-clockwise CCW side of the first pin-shaped terminal 123. Further, the second lead-out part 110d is extended in a clockwise CW direction from the winding part 110c and the coil wire 110 is bound around the second pin-shaped terminal 124 by passing through the clockwise CW side of the second pin-shaped terminal 124. The first lead-out part 110b and the second lead-out part 110d are crossed in a front space of the front face wall part 128.

The first lead-out part 110b is led out to the root portion of the first pin-shaped terminal 123 from the winding part 110c through a coil wire leading-out path 180a comprised of the first inner side region 129a and the second inner side region 129b and bound around the first pin-shaped terminal 123. The second lead-out part 110d is led out to the root portion of the second pin-shaped terminal 124 from the winding part 110c through a coil wire leading-out path 180b comprised of the first inner side region 129a and the second inner side region 129c and bound around the second pin-shaped terminal 124.

More specifically, the first lead-out part 110b is extended in the counter-clockwise CCW direction from the winding part 110c and then, extended obliquely above along the front face wall part 128 in the first inner side region 129a and next, the first lead-out part 110b is contacted with a corner portion 128a formed by the front face wall part 128 and the inclined face part 125a. After that, the first lead-out part 110b is contacted with a corner portion 127a formed between the wall face 127 in the first inner side region 129a and the wall face 130 in the second inner side region 129b. After that, the first lead-out part 110b is extended along the wall face 130 formed to be the same flat face as the side face 123c of the root portion of the first pin-shaped terminal 123 in the second inner side region 129b and a tip end part 110s of the first lead-out part 110b (position located between the first lead-out part 110b and the first binding part 110a) is contacted with an edge on the rear face 123b side of the root part of the side face 123c of the first pin-shaped terminal 123. In this embodiment, the contact part 110t of the first lead-out part 110b with the corner portion 127a is located on the inner side in the radial direction (lower side) with respect to the circuit board receiving face 122a. Further, the tip end part 110s of the first lead-out part 110b is located at the same height as the circuit board receiving face 122a. After that, the tip end side (first binding part 110a) of the coil wire 110 with respect to the first lead-out part 110b is extended in the circumferential direction while contacting with the rear face 123b and then the tip end side of the coil wire 110 is wound around the first pin-shaped terminal 123.

Further, the second lead-out part 110d is extended in the clockwise CW direction from the winding part 110c and then, extended obliquely above along the front face wall part 128 in the first inner side region 129a and next, the second lead-out part 110d is contacted with a corner portion 128a formed between the front face wall part 128 and the inclined face part 125a. After that, the second lead-out part 110d is contacted with a corner portion 127b formed between the wall face 127 in the first inner side region 129a and the wall face 131 in the second inner side region 129c. After that, the second lead-out part 110d is extended along the wall face 131 formed to be the same flat face as the side face 124c of the root portion of the second pin-shaped terminal 124 in the second inner side region 129c and a tip end part 110u of the second lead-out part 110d (position located between the second lead-out part 110d and the second binding part 110e) is contacted with an edge on the rear face 124b side of the root part of the side face 124c of the second pin-shaped terminal 124 (see FIGS. 4(a) and 4(d)). In this embodiment, the contact part 110v of the second lead-out part 110d with the corner portion 127b is located on the inner side in the radial direction (lower side) with respect to the circuit board receiving face 122a. Further, the tip end part 110u of the second lead-out part 110d is located at the same height as the circuit board receiving face 122a. After that, the tip end side (second binding part 110e) of the coil wire 110 with respect to the second lead-out part 110d is extended in the circumferential direction while contacting with the rear face 124b and then the tip end side of the coil wire 110 is wound around the second pin-shaped terminal 124.

In the first coil wound body 11 in FIG. 3, in order to wind the coil wire 110, for example, one end part of the coil wire 110 is bound from the root side of the second pin-shaped terminal 124 to its tip end side (or from the tip end side to the root side) so that the one end part of the coil wire 110 is held by the second pin-shaped terminal 124. As a result, the second binding part 110e is formed. Next, after the coil wire 110 has been wound around the wound part 121 of the coil bobbin 120, the coil wire 110 is led out to the first pin-shaped terminal 123 and, after that, the coil wire 110 is bound around the first pin-shaped terminal 123.

In this embodiment, the second coil wound body 12 is also manufactured by a similar method to the first coil wound body 11.

The wiring circuit board 10 shown in FIGS. 1 and 2 is mounted on the coil bobbin 120. The mounting step is, for example, performed after the stepping motor 1 has been assembled by using the first coil wound body 11 and the second coil wound body 12. In this case, the first pin-shaped terminal 123 and the second pin-shaped terminal 124 are respectively penetrated through two through holes 102 of the wiring circuit board 10 and the wiring circuit board 10 is placed on the circuit board receiving face 122a of the first coil wound body 11 and the circuit board receiving face 152a of the second coil wound body 12. After that, the first binding part 110a and the second binding part 110e of the coil wire 110 are soldered to the land parts 101. Similarly, after the wiring circuit board 10 has been placed on the circuit board receiving face 152a of the second coil wound body 12, the binding parts of the coil wire 140 are soldered to the land parts 101.

In this embodiment, since the lead-out parts (the first lead-out part 110b and the second lead-out part 110d) are passed through the coil wire leading-out paths 180a and 180b, the lead-out parts are respectively connected with the pin-shaped terminals 123 and 124 without passing through positions overlapping with the outer side in the radial direction with respect to the circuit board receiving face 122a. In other words, the lead-out parts are respectively connected with the pin-shaped terminals 123 and 124 by passing through the inner side in the radial direction with respect to the circuit board receiving face 122a. Therefore, the coil wire 110 is not located at a position on the outer side in the radial direction with respect to the circuit board receiving face 122a between the winding part 110c and the binding parts of the pin-shaped terminals 123 and 124, and the lead-out parts (the first lead-out part 110b and the second lead-out part 110d) do not pass over the circuit board receiving face 122a. As a result, a floated portion of the coil wire 110 which is floated from the circuit board receiving face 122a is not formed, in other words, a gap space between the circuit board receiving face 122a and the coil wire 110 is not formed and thus, even when the wiring circuit board 10 is placed on the terminal block part 122, the coil wire 110 is not pressed by the wiring circuit board 10. Therefore, disconnection or damage of the coil wire 110 due to contact of the coil wire 110 with the wiring circuit board 10 or due to that the coil wire 110 is pulled by depression of the wiring circuit board 10 can be prevented. Further, since the coil wire 110 is not located over the circuit board receiving face 122a, an inclination of the wiring circuit board 10 due to the coil wire 110 does not occur and the wiring circuit board 10 can be received by the circuit board receiving face 122a in a face-contacted state. Therefore, the wiring circuit board 10 is placed in a stable state.

Further, the first pin-shaped terminal 123 and the second pin-shaped terminal 124 are provided on inner sides with respect to both side end parts 122c and 122d in the circumferential direction of the terminal block part 122, and the coil wire leading-out path 180 is structured on the inner sides in the circumferential direction with respect to the both side end parts 122c and 122d in the circumferential direction of the terminal block part 122. Therefore, the lead-out parts of the coil wire 110 (the first lead-out part 110b and the second lead-out part 110d) are led out to the first pin-shaped terminal 123 and the second pin-shaped terminal 124 without passing through the side end faces in the circumferential direction of the terminal block part 122. Accordingly, after the coil wire 110 has been wound around the first pin-shaped terminal 123 and the second pin-shaped terminal 124, even when something is contacted with the side end faces of the terminal block part 122 (side end parts 122c and 122d), the coil wire 110 is not disconnected. Further, the lead-out parts of the coil wire 110 (the first lead-out part 110b and the second lead-out part 110d) are not passed through the side end faces in the circumferential direction of the terminal block part 122. Therefore, in a case that the first coil wound body 11 is handled, even when both side end parts 122c and 122d of the terminal block part 122 are held by a hand, the hand does not contact with the coil wire 110 and thus the coil 110 is not disconnected. Therefore, the first coil wound body 11 is easily handled.

Further, the lead-out parts (the first lead-out part 110b and the second lead-out part 110d) are led out in a no-slackened state and the contacted parts (110t and 110v) contacted with the corner portions (127a and 127b) are provided between the winding part 110c and the pin-shaped terminals (123 and 124) where the lead-out parts are bound. As a result, since movements in the radial direction of the contacted parts (110t and 110v) are prevented or reduced, the lead-out parts (the first lead-out part 110b and the second lead-out part 110d) are led out through only predetermined positions of the coil bobbin 120 and are not floated.

Further, in the coil bobbin 120, the upper end part of the front face wall part 128 which is continuously stood up from the rear side flange part 121c of the wound part 121 is formed with the inclined face part 125a, which is formed so as to cut off the front side of the first pin-shaped terminal 123 and the second pin-shaped terminal 124 of the terminal block part 122, and the wall face 127 which is extended upward from the rear end edge of the inclined face part 125a and continuously connected to the front faces 123a and 124a of the root parts of the first pin-shaped terminal 123 and the second pin-shaped terminal 124. In addition, the wall face 127 is formed so as to be the same flat face as the front faces 123a and 124a of the root portions of the first pin-shaped terminal 123 and the second pin-shaped terminal 124. Therefore, the wall face 127 is receded by one step from the front face wall part 128 when the coil bobbin 120 is viewed from the side of the wound part 121. As a result, when the coil wire 110 is to be wound around the wound part 121, the coil wire 110 is hard to be caught by the terminal block part 122, the first pin-shaped terminal 123 and the second pin-shaped terminal 124. Further, since the upper end part of the front face wall part 128 is formed to be the inclined face part 125a, in a case that the coil wire 110 is to be wound around the wound part 121, even when the coil wire 110 is displaced to a side of the terminal block part 122, the displaced portion of the coil wire 110 is returned to the wound part 121 side without being caught by the terminal block part 122. Therefore, disconnection of the coil wire 110 is prevented when the coil wire 110 is to be wound around the winding part 121.

Further, the first pin-shaped terminal 123, the second pin-shaped terminal 124 and the terminal block part 122 are integrally formed of resin. Therefore, different from a case that pin-shaped terminals formed of separated members from the terminal block part 122 are used, even when the terminal block part 122 is designed in any shape in order to prevent disconnection of the coil wire 110, a problem does not occur that the first pin-shaped terminal 123 and the second pin-shaped terminal 124 are detached from the terminal block part 122.

In the first embodiment, the tip end part 110s of the first lead-out part 110b and the tip end part 110u of the second lead-out part 110d are contacted with the root portions of the pin-shaped terminals 123 and 124. However, according to an embodiment of the present invention, the first lead-out part 110b and the second lead-out part 110d are only required to be contacted with the pin-shaped terminals 123 and 124 without passing through the positions overlapping with the outer side in the radial direction with respect to the circuit board receiving face 122a and thus the contacted positions of the tip end parts 110s and 110u are not limited to the root portions of the pin-shaped terminals 123 and 124.

Therefore, for example, as shown by the dotted lines in FIG. 3, it may be structured so that the first lead-out part 110b' is contacted with the corner portion 128a between the front face wall part 128 and the inclined face part 125b after having been extended obliquely above along the front face wall part 128 and, after that, the first lead-out part 110b' is contacted with the corner portion 127a between the wall face 127 of the first inner side region 129a and the wall face 130 of the second inner side region 129b and then the tip end part 110s' of the first lead-out part 110b' is contacted with the outer side in the radial direction (upper side) with respect to the circuit board receiving face 122a at an edge position of the rear face 123b side of the side face 123c of the first pin-shaped terminal 123. Similarly, it may be structured so that the tip end part 110u' of the second lead-out part 110d' is contacted with the outer side in the radial direction (upper side) with respect to the circuit board receiving face 122a at an edge position of the rear face 124b side of the side face 124c of the second pin-shaped terminal 124.

Further, as shown by the alternate long and short dash line in FIG. 3, it may be structured so that the first lead-out part 110b" is contacted with the corner portion 128a between the front face wall part 128 and the inclined face part 125b after having been extended obliquely above along the front face wall part 128 and, after that, the tip end part 110s" of the first lead-out part 110b" is contacted with the outer side in the radial direction (upper side) with respect to the circuit board receiving face 122a at an edge position of the front face 123a side of the side face 123c of the first pin-shaped terminal 123. Similarly, it may be structured so that the tip end part 110u" of the second lead-out part 110d" is contacted with the outer side in the radial direction (upper side) with respect to the circuit board receiving face 122a at an edge position of the front face 124a side of the side face 124c of the second pin-shaped terminal 124. In these states, the first pin-shaped terminal 123 and the second pin-shaped terminal 124 are respectively penetrated through the through holes 102 of the wiring circuit board 10. Therefore, when the tip end part 110s" and the tip end part 110u" are led out from the through holes 102 without being pressed by the wiring circuit board 10, the similar state can be obtained that the first lead-out part 110b" and the second lead-out part 110d" are passed through the inner side in the radial direction with respect to the circuit board receiving face 122a and then contacted with the respective pin-shaped terminals 123 and 124.

In addition, although not shown, it may be structured so that the first lead-out part 110b is contacted with the corner portion 128a between the front face wall part 128 and the inclined face part 125b after having been extended obliquely above along the front face wall part 128 and, after that, the first lead-out part 110b is contacted with a lower end of the corner portion 127a between the wall face 127 of the first inner side region 129a and the wall face 130 of the second inner side region 129b and then led out along the inclined face part 125b and, after that, the tip end part 110s of the first lead-out part 110b is contacted with the edge portion of the rear face 123b side of the side face 123c of the first pin-shaped terminal 123. Similarly, it may be structured so that the second lead-out part 110d' is led out along the inclined face part 125b and then the tip end part 110u of the second lead-out part 110d' is contacted with an edge portion of the rear face 124b side of the side face 124c of the second pin-shaped terminal 124.

In any modified example, the coil wire 110 is not located on the outer side in the radial direction with respect to the circuit board receiving face 122a between the portion led out from the winding part 110c and the binding parts of the respective pin-shaped terminals 123 and 124 and, in addition, the lead-out parts (the first lead-out part 110b and the second lead-out part 110d) do not pass over the circuit board receiving face 122a. As a result, the coil wire 110 is not floated from the circuit board receiving face 122a and thus, even when the wiring circuit board 10 is placed on the terminal block part 122, the coil wire 110 is not pressed by the wiring circuit board 10. Therefore, disconnection or damage of the coil wire 110 due to contact of the coil wire 110 with the wiring circuit board 10 or due to that the coil wire 110 is pulled by depression of the wiring circuit board 10 can be prevented. Further, since the coil wire 110 is not located on the circuit board receiving face 122a, an inclination of the wiring circuit board 10 due to the coil wire 110 does not occur and the wiring circuit board 10 can be received by the circuit board receiving face 122a in a face-contacted state. Therefore, the wiring circuit board 10 is received in a stable state.

In the first embodiment, the inclined face parts 125b and 125c are inclined toward the winding part 121 from the positions adjacent in the circumferential direction to the rear face 123b of the first pin-shaped terminal 123 and the rear face 124b of the second pin-shaped terminal 124. However, it may be structured so that the inclined face parts 125b and 125c are inclined toward the wound part 121 from the front side or the rear side with respect to the positions adjacent in the circumferential direction to the rear face 123b of the first pin-shaped terminal 123 and the rear face 124b of the second pin-shaped terminal 124. In other words, the second inner side regions 129b and 129c may be respectively formed from the front side or the rear side with respect to the positions adjacent in the circumferential direction to the rear face 123b of the first pin-shaped terminal 123 and the rear face 124b of the second pin-shaped terminal 124.

Further, in the first embodiment, the second inner side regions 129b and 129c may be structured so that perpendicularly recessed parts are formed instead of the inclined face parts 125b and 125c.

In addition, in the first embodiment, the pin-shaped terminals 123 and 124 are made of resin and integrally formed with the wound part 121 and the terminal block part 122. However, a metal pin may be used as the pin-shaped terminals 123 and 124. In this case, for example, the metal pins may be integrally formed with the terminal block part 122 by insert molding. When the pin-shaped terminal is structured of a metal pin, a portion located on the outer side in the radial direction with respect to the circuit board receiving face 122a is regarded as the pin-shaped terminal. An exposed portion of the pin-shaped terminal on an inner side in the radial direction with respect to the circuit board receiving face 122a is regarded as a part of the terminal block part 122.

Second Embodiment

Figure 5:
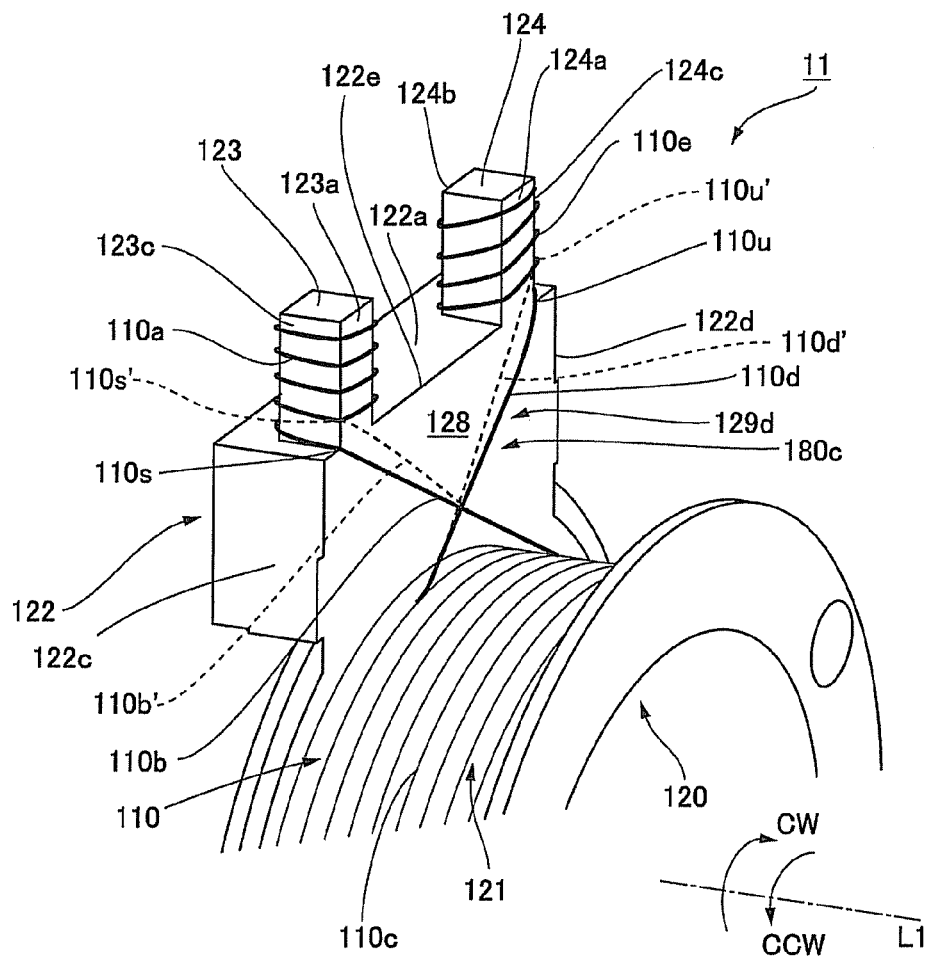
FIG. 5 is an enlarged perspective view showing a terminal block part of a coil wound body which is used in a motor in accordance with a second embodiment of the present invention.

FIG. 5 is an enlarged perspective view showing a terminal block part of a coil wound body used in a motor in accordance with a second embodiment of the present invention. A basic structure of the second embodiment is similar to the first embodiment and thus the same reference signs are used in common portions and their detailed descriptions are omitted.

As shown in FIG. 5, in the second embodiment, similarly to the first embodiment, a coil bobbin 120 of a first coil wound body 11 is formed with a terminal block part 122 having a large thickness so as to protrude to an outer side in a radial direction from a wound part 121. A face directing to the outer side of the most outer portion in the radial direction of the terminal block part 122 is formed as a circuit board receiving face 122a on which a wiring circuit board 10 is disposed in an overlapped manner. Two pieces of a first pin-shaped terminal 123 and a second pin-shaped terminal 124 which are formed in a square bar-shape are stood up to an outer side in the radial direction from the circuit board receiving face 122a of the terminal block part 122. The first pin-shaped terminal 123 and the second pin-shaped terminal 124 are made of resin and, when the coil bobbin 120 is to be molded by using resin, they are integrally formed with the coil bobbin 120. Both of the first pin-shaped terminal 123 and the second pin-shaped terminal 124 are stood up at inner side positions in the circumferential direction with respect to side end parts 122c and 122d of the terminal block part 122 and protruded to an outer side in the radial direction with respect to the circuit board receiving face 122a. Further, the first pin-shaped terminal 123 and the second pin-shaped terminal 124 are stood up at separated positions in the circumferential direction.

In this embodiment, the first pin-shaped terminal 123 and the second pin-shaped terminal 124 are stood up from a front edge 122e on an end part on an outer side in the radial direction of the terminal block part 122, and a front face wall part 128 is continuously connected with front faces 123a and 124a of the first pin-shaped terminal 123 and the second pin-shaped terminal 124. Therefore, in this embodiment, the front face wall part 128 is formed so as to be the same flat face as the front faces 123a and 124a of the root portions of the first pin-shaped terminal 123 and the second pin-shaped terminal 124. Further, in an end part on an outer side in the radial direction of the terminal block part 122, an entire flat face except a region where the first pin-shaped terminal 123 and the second pin-shaped terminal 124 are stood up is formed as a circuit board receiving face 122a. In the coil bobbin 120 structured as described above, the entire front side of the first pin-shaped terminal 123 and the second pin-shaped terminal 124 is formed to be an inner side region 129d which is located on an inner side in the radial direction with respect to the circuit board receiving face 122a. In other words, in a state that the wiring circuit board 10 is disposed on the circuit board receiving face 122a formed on the terminal block part 122 and the first pin-shaped terminal 123 and the second pin-shaped terminal 124 are penetrated through the through holes 102 of the land parts 101 formed in the wiring circuit board 10, the inner side region 129d is formed at the inner side position in the radial direction with respect to the root portions of the first pin-shaped terminal 123 and the second pin-shaped terminal 124 and with respect to the circuit board receiving face 122a on which the wiring circuit board 10 is disposed.

A first lead-out part 110b of the coil wire 110 is led out from the winding part 110c to a root portion of the first pin-shaped terminal 123 through a coil wire leading-out path 180c comprised of the inner side region 129d and is bound around the first pin-shaped terminal 123. Similarly, the second lead-out part 110d is also led out from the winding part 110c to a root portion of the second pin-shaped terminal 124 through the coil wire leading-out path 180c comprised of the inner side region 129d and is bound around the second pin-shaped terminal 124.

More specifically, the first lead-out part 110b is extended in a counter-clockwise CCW direction from the winding part 110c and then, extended obliquely above along the front face wall part 128 in the inner side region 129d. After that, a tip end part 110s of the first lead-out part 110b (portion which is located at a position between the first lead-out part 110b and a first binding part 110a) is contacted with an edge on one side face 123c side of the root portion of the front face 123a of the first pin-shaped terminal 123. The tip end part 110s of the first lead-out part 110b is located at the same height as the circuit board receiving face 122a. After that, a tip end side with respect to the first lead-out part 110b (first binding part 110a) in the coil wire 110 is extended to a rear side while contacting with the side face 123c and, after that, the tip end side is wound around the first pin-shaped terminal 123.

Further, the second lead-out part 110d is extended in a clockwise CW direction from the winding part 110c and then, extended obliquely above along the front face wall part 128 in the inner side region 129d. After that, a tip end part 110u of the second lead-out part 110d (portion which is located at a position between the second lead-out part 110d and a second binding part 110e) is contacted with an edge on one side face 124c side (which is opposite side to the side face 123c) of the root portion of the front face 124a of the second pin-shaped terminal 124. The tip end part 110u of the second lead-out part 110d is located at substantially the same height as the circuit board receiving face 122a. After that, a tip end side with respect to the second lead-out part 110d (second binding part 110e) in the coil wire 110 is extended to a rear side while contacting with the side face 124c and, after that, the tip end side is wound around the second pin-shaped terminal 124.

Also in this embodiment, since the lead-out parts (the first lead-out part 110b and the second lead-out part 110d) are passed through the coil wire leading-out path 180c, the lead-out parts are respectively contacted with the pin-shaped terminals 123 and 124 without passing through positions overlapping with the outer side in the radial direction with respect to the circuit board receiving face 122a. In other words, the lead-out parts are respectively passed through the inner side in the radial direction with respect to the circuit board receiving face 122a and contacted with the pin-shaped terminals 123 and 124. Therefore, the coil wire 110 is not located at a position on the outer side in the radial direction with respect to the circuit board receiving face 122a between the winding part 110c and the binding parts of the pin-shaped terminals 123 and 124, and the lead-out parts (the first lead-out part 110b and the second lead-out part 110d) do not pass over the circuit board receiving face 122a. As a result, the coil wire 110 is not floated from the circuit board receiving face 122a and thus, even when the wiring circuit board 10 is placed on the terminal block part 122, the coil wire 110 is not pressed by the wiring circuit board 10. Therefore, disconnection or damage of the coil wire 110 due to contact of the coil wire 110 with the wiring circuit board 10 or due to that the coil wire 110 is pulled by depression of the wiring circuit board 10 can be prevented. Further, since the coil wire 110 is not located over the circuit board receiving face 122a, an inclination of the wiring circuit board 10 due to the coil wire 110 does not occur and the wiring circuit board 10 can be received by the circuit board receiving face 122a in a face-contacted state. Therefore, the wiring circuit board 10 is received in a stable state.

Further, in this embodiment, the coil wire leading-out path 180c is structured only on the front side of the pin-shaped terminals 123 and 124 and thus an area for the circuit board receiving face 122a can be widely secured on the terminal block part 122. Therefore, the wiring circuit board 10 can be received in a stable state.

Also in this embodiment, the first lead-out part 110b and the second lead-out part 110d are only required to be contacted with the pin-shaped terminals 123 and 124 without passing through the positions overlapping with the outer side in the radial direction with respect to the circuit board receiving face 122a and thus the contacted positions of the tip end parts 110s and 110u are not limited to the root portions of the pin-shaped terminals 123 and 124.

For example, as shown by the dotted line in FIG. 5, the tip end part 110s' of the first lead-out part 110b' may be led out so as to contact with an outer side in the radial direction (upper side) with respect to the circuit board receiving face 122a at an edge portion on the side face 123c side of the front face 123a of the first pin-shaped terminal 123. Similarly, the tip end part 110u' of the second lead-out part 110d may be led out so as to contact with an outer side in the radial direction (upper side) with respect to the circuit board receiving face 122a at an edge portion on the side face 124c side of the front face 124a of the second pin-shaped terminal 124. Also in this case, since the first pin-shaped terminal 123 and the second pin-shaped terminal 124 are respectively penetrated through the through holes 102 of the wiring circuit board 10, when the tip end part 110s' and the tip end part 110u' are led out through the through holes 102, similar operations and effects to the second embodiment can be attained.

Also in the second embodiment, the pin-shaped terminals 123 and 124 are made of resin and integrally formed with the winding part 121 and the terminal block part 122. However, a metal pin may be used as the pin-shaped terminals 123 and 124. In this case, for example, the metal pins may be integrally formed with the terminal block part 122 by insert molding.

Third Embodiment

Figure 6:
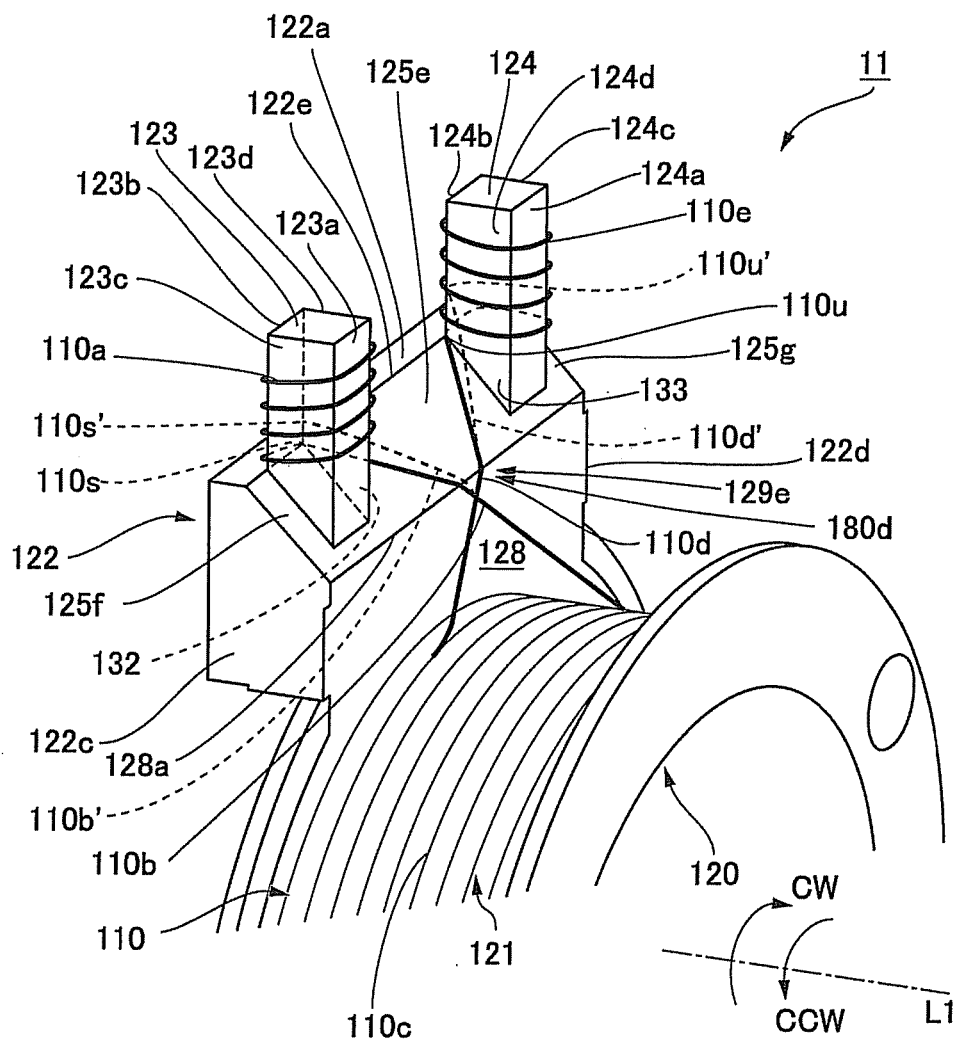
FIG. 6 is an enlarged perspective view showing a terminal block part of a coil wound body which is used in a motor in accordance with a third embodiment of the present invention.
Figure 7:
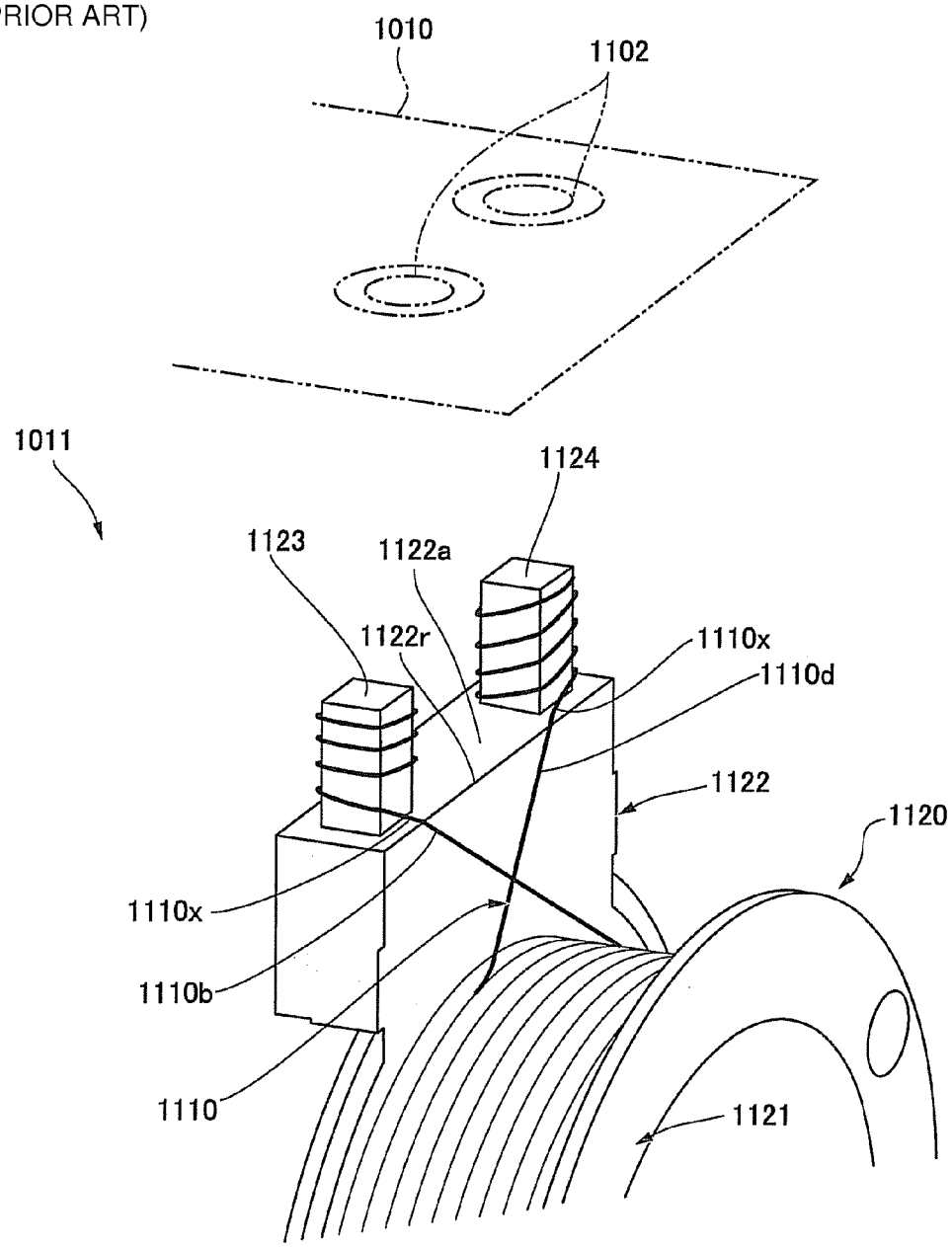
FIG. 7 is an explanatory perspective view showing a conventional coil wound body.

FIG. 6 is an enlarged perspective view showing a terminal block part of a coil wound body used in a motor in accordance with a third embodiment of the present invention. A basic structure of the third embodiment is similar to the first embodiment and thus the same reference signs are used in common portions and their detailed descriptions are omitted. In the first and second embodiments, the coil wire is bound around from the outer side of the pin-shaped terminal. However, in the third embodiment, the coil wire is bound around from the inner side of the pin-shaped terminal as described below.

As shown in FIG. 6, also in the third embodiment, similarly to the first embodiment, a coil bobbin 120 of a first coil wound body 11 is formed with a terminal block part 122 having a large thickness so as to protrude to an outer side in a radial direction from a wound part 121. A face directing to the outer side of the most outer portion in the radial direction of the terminal block part 122 is formed as a circuit board receiving face 122a on which a wiring circuit board 10 is disposed in an overlapped manner. Two pieces of a first pin-shaped terminal 123 and a second pin-shaped terminal 124 which are formed in a square bar-shape are stood up to an outer side in the radial direction from the circuit board receiving face 122a of the terminal block part 122. The first pin-shaped terminal 123 and the second pin-shaped terminal 124 are made of resin and, when the coil bobbin 120 is to be molded by using resin, they are integrally formed with the coil bobbin 120. Both of the first pin-shaped terminal 123 and the second pin-shaped terminal 124 are stood up at inner side positions in the circumferential direction with respect to side end parts 122c and 122d of the terminal block part 122 and protruded to an outer side in the radial direction with respect to the circuit board receiving face 122a. Further, the first pin-shaped terminal 123 and the second pin-shaped terminal 124 are stood up at separated positions in the circumferential direction. Further, the first pin-shaped terminal 123 and the second pin-shaped terminal 124 are provided at a substantially center position in the axial line "L1" direction on an end part on the outer side in the radial direction of the terminal block part 122.

On both sides adjacent in the circumferential direction to the first pin-shaped terminal 123 in the terminal block part 122, a region which is adjacent to an opposite side to an extending direction of the first lead-out part 110b from the winding part 110c (counter-clockwise CCW direction) is formed to be an inclined face part 125e which is inclined toward the wound part 121. Further, on both sides adjacent in the circumferential direction to the second pin-shaped terminal 124, a region which is adjacent to an opposite side to an extending direction of the second lead-out part 110d from the winding part 110c (clockwise CW direction) is formed to be the inclined face part 125e which is inclined toward the wound part 121. In other words, a portion between the first pin-shaped terminal 123 and the second pin-shaped terminal 124 of the terminal block part 122 is cut off toward the front side and the inclined face part 125e inclining toward the wound part 121 is formed. The inclined face part 125e is inclined toward the wound part 121 from the position adjacent in the circumferential direction to the rear face 123b of the first pin-shaped terminal 123 and the rear face 124b of the second pin-shaped terminal 124.

Further, the inclined face part 125e is connected with the front face wall part 128. Therefore, a region between the first pin-shaped terminal 123 and the second pin-shaped terminal 124 and its front side region is formed to be an inner side region 129e which is located on an inner side in the radial direction (lower side) with respect to the circuit board receiving face 122a. In other words, in a state that the wiring circuit board 10 is disposed on the circuit board receiving face 122a and the first pin-shaped terminal 123 and the second pin-shaped terminal 124 are penetrated through the through holes 102 of the land parts 101 formed in the wiring circuit board 10, the inner side region 129e is formed at the inner side position in the radial direction with respect to the root portions of the first pin-shaped terminal 123 and the second pin-shaped terminal 124 and with respect to the circuit board receiving face 122a. An upper side from an edge on the first pin-shaped terminal 123 side of the inclined face part 125e is formed with a wall face 132 which is continuously connected with the side face 123d of the first pin-shaped terminal 123. The wall face 132 is formed in the terminal block part 122 on the inner side in the radial direction with respect to the circuit board receiving face 122a so as to continuously form the same flat face as the side face 123d of the root portion of the first pin-shaped terminal 123. Further, an upper side from an edge on the second pin-shaped terminal 124 side of the inclined face part 125e is formed with a wall face 133 which is continuously connected with the side face 124d of the second pin-shaped terminal 124. The wall face 133 is formed in the terminal block part 122 on the inner side in the radial direction with respect to the circuit board receiving face 122a so as to continuously form the same flat face as the side face 124d of the root portion of the second pin-shaped terminal 124.

In this embodiment, inclined face parts 125f and 125g being inclined toward the wound part 121 are formed in regions adjacent on outer sides to the first pin-shaped terminal 123 and the second pin-shaped terminal 124. Lower end sides of the inclined face parts 125f and 125g are connected with the inclined face part 125e. Therefore, front sides of the first pin-shaped terminal 123 and the second pin-shaped terminal 124 are also formed in an inclined face part.

In the terminal block part 122 structured as described above, a flat face of the outer side end part except the first pin-shaped terminal 123, the second pin-shaped terminal 123 and the inclined face parts 125e through 125g is formed to be the circuit board receiving face 122a.

In this embodiment, an extending direction of the first lead-out part 110b from the winding part 110c is a counter-clockwise CCW direction and the coil wire 110 is bound around the first pin-shaped terminal 123 through a clockwise direction CW side with respect to the first pin-shaped terminal 123 (opposite side to the extending direction of the first lead-out part 110*b* from the winding part 110*c*). Therefore, the first lead-out part 110*b* is passed through between the first pin-shaped terminal 123 and the second pin-shaped terminal 124. Further, an extending direction of the second lead-out part 110*d* from the winding part 110*c* is a clockwise CW direction and the coil wire 110 is bound around the second pin-shaped terminal 124 through a counter-clockwise direction CCW side with respect to the second pin-shaped terminal 124 (opposite side to the extending direction of the second lead-out part 110*d* from the winding part 110*c*). Therefore, the second lead-out part 110*d* is passed through between the first pin-shaped terminal 123 and the second pin-shaped terminal 124. The first lead-out part 110*b* and the second lead-out part 110*d* are crossed in a front space of the front face wall part 128.

More specifically, the first lead-out part 110*b* is led out from the winding part 110*c* to the root portion of the first pin-shaped terminal 123 through the coil wire leading-out path 180*d* comprised of the inner side region 129*e* and bound around the first pin-shaped terminal 123. In other words, the first lead-out part 110*b* is extended in the counter-clockwise CCW direction from the winding part 110*c* along the front face wall part 128 and next, the first lead-out part 110*b* is contacted with a corner portion 128*a* formed by the front face wall part 128 and the inclined face part 125*e*. After that, the first lead-out part 110*b* is extended along the inclined face part 125*e* and then the tip end part 110*s* of the first lead-out part 110*b* (position located between the first lead-out part 110*b* and the first binding part 110*a*) is contacted with an edge on the rear face 123*b* side of the root part of the side face 123*d* of the first pin-shaped terminal 123. Further, the tip end part 110*s* of the first lead-out part 110*b* is located at the same height as the circuit board receiving face 122*a*. After that, the tip end side (first binding part 110*a*) of the coil wire 110 with respect to the first lead-out part 110*b* is extended in the circumferential direction while contacting with the rear face 123*b* and then the tip end side of the coil wire 110 is wound around the first pin-shaped terminal 123.

Further, the second lead-out part 110*d* is led out to the root portion of the second pin-shaped terminal 124 through the coil wire leading-out path 180*d* comprised of the inner side region 129*e* and bound around the second pin-shaped terminal 124. In other words, the second lead-out part 110*d* is extended in the clockwise CW direction from the winding part 110*c* and then, contacted with a corner portion 128*a* formed between the front face wall part 128 and the inclined face part 125*a*. Next, the second lead-out part 110*d* is extended along the inclined face part 125*e* and a tip end part 110*u* of the second lead-out part 110*d* (position located between the second lead-out part 110*d* and the second binding part 110*e*) is contacted with an edge on the rear face 124*b* side of the root part of the side face 124*d* of the second pin-shaped terminal 124. The tip end part 110*u* of the second lead-out part 110*d* is located at substantially the same height as the circuit board receiving face 122*a*. After that, the tip end side (second binding part 110*e*) of the coil wire 110 with respect to the second lead-out part 110*d* is extended in the circumferential direction while contacting with the rear face 124*b* and then the tip end side of the coil wire 110 is wound around the second pin-shaped terminal 124.

Also in this embodiment, since the lead-out parts (the first lead-out part 110*b* and the second lead-out part 110*d*) are passed through the coil wire leading-out path 180*d*, the lead-out parts are respectively contacted with the pin-shaped terminals 123 and 124 without passing through positions overlapping with the outer side in the radial direction with respect to the circuit board receiving face 122*a*. Therefore, the coil wire 110 is not located at a position on the outer side in the radial direction with respect to the circuit board receiving face 122*a* between the winding part 110*c* and the binding parts of the pin-shaped terminals 123 and 124, and the lead-out parts (the first lead-out part 110*b* and the second lead-out part 110*d*) are not passed over the circuit board receiving face 122*a*. As a result, the coil wire 110 is not floated from the circuit board receiving face 122*a* and thus, even when the wiring circuit board 10 is placed on the terminal block part 122, the coil wire 110 is not pressed by the wiring circuit board 10. Therefore, disconnection or damage of the coil wire 110 due to contact of the coil wire 110 with the wiring circuit board 10 or due to that the coil wire 110 is pulled by depression of the wiring circuit board 10 can be prevented. Further, since the coil wire 110 is not located over the circuit board receiving face 122*a*, an inclination of the wiring circuit board 10 due to the coil wire 110 does not occur and the wiring circuit board 10 can be received by the circuit board receiving face 122*a* in a face-contacted state. Therefore, the wiring circuit board 10 is received in a stable state.

Further, since the inclined face part 125*e* is formed between the first pin-shaped terminal 123 and the second pin-shaped terminal 124, the lead-out parts (first lead-out part 110*b* and second lead-out part 110*d*) are led out along the inclined face part 125*e* and thus the lead-out parts (first lead-out part 110*b* and second lead-out part 110*d*) are led out in a stable state. Further, since the lead-out parts (first lead-out part 110*b* and second lead-out part 110*d*) are led out along the inclined face part, an unnecessary floating is hard to occur in the lead-out parts (first lead-out part 110*b* and second lead-out part 110*d*). Moreover, the inclined face part 125*e* is inclined toward the wound part 121 from the positions adjacent in the circumferential direction to the rear face 123*b* of the first pin-shaped terminal 123 and the rear face 124*b* of the second pin-shaped terminal 124. Therefore, the entire lead-out parts (first lead-out part 110*b* and second lead-out part 110*d*) can be led out along the inclined face part 125*e* on the terminal block part 122 and thus an unnecessary floating is hard to occur in the lead-out parts. Accordingly, a problem can be prevented in which the lead-out parts are caught by something to cause the coil wire to be disconnected.

Also in this embodiment, the first lead-out part 110*b* and the second lead-out part 110*d* are only required to be contacted with the pin-shaped terminals 123 and 124 without passing through the positions overlapping with the outer side in the radial direction with respect to the circuit board receiving face 122*a* and thus the contacted positions of the tip end parts 110*s* and 110*u* are not limited to the root portions of the pin-shaped terminals 123 and 124.

For example, as shown by the dotted line in FIG. 6, it may be structured so that the first lead-out part 110*b*' is extended obliquely above along the front face wall part 128 and then contacted with the corner portion 128*a* formed by the front face wall part 128 and the inclined face part 125*e* and, after that, its tip end part 110*s*' is contacted with an edge on the rear face 123*b* side of the side face 123*d* of the first pin-shaped terminal 123 on an outer side in the radial direction (upper side) with respect to the circuit board receiving face 122*a*. Similarly, it may be structured so that the second lead-out part 110*d*' is extended obliquely above along the front face wall part 128 and then contacted with the corner portion 128*a* formed by the front face wall part 128 and the inclined face part 125*e* and, after that, its tip end part 110*u*' is contacted with an edge on the rear face 124*b* side of the side face 124*d* of the second pin-shaped terminal 124 on an outer side in the radial direction (upper side) with respect to the circuit board receiving face 122a. Also in this case, similar operations and effects to the third embodiment can be attained.

In the third embodiment, the inclined face part 125e is inclined toward the wound part 121 from the positions adjacent in the circumferential direction to the rear face 123b of the first pin-shaped terminal 123 and the rear face 124b of the second pin-shaped terminal 124. However, it may be structured so that the inclined face part 125e is inclined toward the wound part 121 from a rear side with respect to the position adjacent in the circumferential direction to the rear face 123b of the first pin-shaped terminal 123 and the rear face 124b of the second pin-shaped terminal 124. In other words, the inner side region 129e may be formed from a rear side with respect to the position adjacent in the circumferential direction to the rear face 123b of the first pin-shaped terminal 123 and the rear face 124b of the second pin-shaped terminal 124.

In the third embodiment, the inclined face part 125e is formed in order to structure the inner side region 129e between the first pin-shaped terminal 123 and the second pin-shaped terminal 124. However, the inner side region 129e may be structured by a recessed part which is perpendicularly recessed.

In the third embodiment, the pin-shaped terminals 123 and 124 are made of resin and integrally formed with the wound part 121 and the terminal block part 122. However, a metal pin may be used as the pin-shaped terminals 123 and 124. In this case, for example, the metal pins may be integrally formed with the terminal block part 122 by insert molding. In accordance with an embodiment of the present invention, when the pin-shaped terminal is structured of a metal pin or the like, a portion located on the outer side in the radial direction with respect to the circuit board receiving face 122a is regarded as the pin-shaped terminal. An exposed portion of the pin-shaped terminal on an inner side in the radial direction with respect to the circuit board receiving face 122a is regarded as a part of the terminal block part 122.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coil wound body comprising:
   a coil bobbin around which a coil wire is wound, the coil bobbin comprising:
      a wound part around which the coil wire is wound;
      a terminal block part which is protruded toward an outer side in a radial direction from the wound part;
      a circuit board receiving face which is located on the outer side in the radial direction of the terminal block part and on which a wiring circuit board is disposed in an overlapped manner; and
      pin-shaped terminals which are located on the outer side in the radial direction with respect to the circuit board receiving face and protruded toward the outer side in the radial direction; and
   wherein the coil wire comprises:
      a winding part which is wound around the wound part of the coil bobbin;
      lead-out parts which are led out from the winding part to contacted positions with the pin-shaped terminals; and
      binding parts which are located on tip end sides with respect to the lead-out parts and bound around the pin-shaped terminals;
   wherein the coil bobbin is provided with a coil wire leading-out path which reaches to root portions of the pin-shaped terminals from the wound part through an inner side in the radial direction with respect to the circuit board receiving face; and
   wherein the lead-out parts of the coil wire are led out to the contacted positions with the pin-shaped terminals by passing through the coil wire leading-out path without passing through a position overlapping with the outer side in the radial direction of the circuit board receiving face.

2. The coil wound body according to claim 1, wherein
   the pin-shaped terminals are provided on inner sides with respect to both side end parts in a circumferential direction of the terminal block part, and
   the coil wire leading-out path is structured on an inner side in the circumferential direction with respect to both the side end parts in the circumferential direction of the terminal block part.

3. The coil wound body according to claim 2, wherein the lead-out part of the coil wire is led out from the winding part to the pin-shaped terminal in a taut state.

4. The coil wound body according to claim 1, wherein
   the coil wire leading-out path of the coil bobbin is structured so as to pass through a front side where the wound part is located with respect to the pin-shaped terminals,
   the front side of the terminal block part with respect to the pin-shaped terminals is formed to be a first inner side region which is located on the inner side in the radial direction with respect to the circuit board receiving face and structures the coil wire leading-out path of the coil bobbin, and
   a region which is adjacent in a circumferential direction to the pin-shaped terminal in an extending direction of the lead-out part of the coil wire from the wound part is formed to be a second inner side region which is located on the inner side in the radial direction with respect to the circuit board receiving face and structures the coil wire leading-out path of the coil bobbin.

5. The coil wound body according to claim 4, wherein
   a front face of the pin-shaped terminal where the wound part is located is extended toward a wound part side with respect to the circuit board receiving face so that a wall face is formed so as to be continuously connected with a front face of a root portion of the pin-shaped terminal, and a front space of the wall face is formed to be the first inner side region,
   the terminal block part is formed with a wall face which is continuously connected with a side face of the root portion of the pin-shaped terminal in a region adjacent to the pin-shaped terminal in the extending direction of the lead-out part from the wound part, and the wall face is formed to be the second inner side region, and
   the lead-out part of the coil wire is contacted with a corner portion between the wall face in the first inner side region and the wall face in the second inner side region, and a tip end part of the lead-out part is contacted with an edge on a rear face side of the root portion of a side face of the pin-shaped terminal and bound around the pin-shaped terminal.

6. The coil wound body according to claim 5, wherein the coil bobbin is provided with a flange part whose diameter is enlarged at an end part of a body part of the wound part, and the lead-out part of the coil wire is contacted with a corner portion between an upper end part of a front face wall part which is continuously formed from the flange part toward the outer side in the radial direction and the wall face of the first inner side region.

7. The coil wound body according to claim 4, wherein the region which is adjacent in the circumferential direction to the pin-shaped terminal in the extending direction of the lead-out part of the coil wire from the wound part is formed to be an inclined face part which is inclined toward the wound part of the coil bobbin to structure the second inner side region.

8. The coil wound body according to claim 7, wherein the inclined face part is inclined toward the wound part from a position adjacent in the circumferential direction to a rear face of the pin-shaped terminal which is located on an opposite side to the wound part.

9. The coil wound body according to claim 1, wherein
the coil wire leading-out path of the coil bobbin is structured so as to pass through a front side where the wound part is located with respect to the pin-shaped terminal, and
the front side where the wound part is located with respect to the pin-shaped terminal is formed to be an inner side region which is located on the inner side in the radial direction with respect to the circuit board receiving face and structures the coil wire leading-out path.

10. The coil wound body according to claim 1, wherein
the coil wire leading-out path of the coil bobbin is structured so as to pass through a region which is adjacent in a circumferential direction to the pin-shaped terminal on an opposite side to an extending direction of the lead-out part of the coil wire from the wound part, and
in the terminal block part, the region which is adjacent to the pin-shaped terminal and a front side region on the wound part side with respect to the region are formed to be an inner side region which is located on the inner side in the radial direction with respect to the circuit board receiving face and structures the coil wire leading-out path.

11. The coil wound body according to claim 10, wherein the region which is adjacent to the pin-shaped terminal on the opposite side to the extending direction of the lead-out part of the coil wire from the wound part is formed to be an inclined face part which is inclined toward the wound part to structure the inner side region.

12. The coil wound body according to claim 11, wherein the inclined face part is inclined toward the wound part from a position adjacent in the circumferential direction to a rear face of the pin-shaped terminal which is located on an opposite side to the wound part.

13. The coil wound body according to claim 1, wherein the pin-shaped terminals and the terminal block part are integrally formed of resin.

14. The coil wound body according to claim 13, wherein
a front face of the pin-shaped terminal on a side where the wound part is located is formed with a wall face in the terminal block part so as to extend toward the wound part side with respect to the circuit board receiving face and so as to continuously form a same face on the inner side in the radial direction as the front face of a root portion of the pin-shaped terminal, and
in the terminal block part, a front space of the wall face is formed to be a first inner side region which is located on the inner side in the radial direction with respect to the circuit board receiving face and structures the coil wire leading-out path.

15. The coil wound body according to claim 14, wherein
the pin-shaped terminals are provided on inner sides with respect to both side end parts in a circumferential direction of the terminal block part, and
the coil wire leading-out path is structured on an inner side in the circumferential direction with respect to both the side end parts in the circumferential direction of the terminal block part.

16. The coil wound body according to claim 15, wherein
a wall face is formed so as to continuously form a same face on the inner side in the radial direction as a side face of a root portion of the pin-shaped terminal in at least one of both sides of the terminal block part which are adjacent in the circumferential direction to the pin-shaped terminal, and
the wall face forms a second inner side region which is located on the inner side in the radial direction with respect to the circuit board receiving face and structures the coil wire leading-out path.

17. The coil wound body according to claim 16, wherein
the lead-out part of the coil wire is contacted with a corner portion between the wall face in the first inner side region and the wall face in the second inner side region, and
a tip end part of the lead-out part is contacted with an edge on a rear face side of the root portion of the side face of the pin-shaped terminal and bound around the pin-shaped terminal.

18. The coil wound body according to claim 13, wherein
a wall face is formed so as to continuously form a same face on the inner side in the radial direction as a side face of a root portion of the pin-shaped terminal in at least one of both sides of the terminal block part which are adjacent in the circumferential direction to the pin-shaped terminal, and
the wall face forms a second inner side region which is located on the inner side in the radial direction with respect to the circuit board receiving face and structures the coil wire leading-out path.

19. A motor comprising:
a coil wound body which is provided with a coil bobbin around which a coil wire is wound;
a stator which is provided with the coil wound body; and
a rotor which is provided with a rotor magnet and disposed on an inner peripheral side of the stator;
wherein the coil bobbin comprises:
a wound part around which the coil wire is wound;
a terminal block part which is protruded toward an outer side in a radial direction from the wound part;
a circuit board receiving face which is located on the outer side in the radial direction of the terminal block part and on which a wiring circuit board is disposed in an overlapped manner; and
pin-shaped terminals which are located on the outer side in the radial direction with respect to the circuit board receiving face and protruded toward the outer side in the radial direction;
wherein the coil wire comprises:
a winding part which is wound around the wound part;
lead-out parts which are led out from the winding part to the pin-shaped terminals; and
binding parts which are located on tip end sides with respect to the lead-out parts and bound around the pin-shaped terminals;

wherein the coil bobbin is provided with a coil wire leading-out path which reaches to root portions of the pin-shaped terminals from the wound part through an inner side in the radial direction with respect to the circuit board receiving face; and wherein the lead-out parts of the coil wire contact the pin-shaped terminals by passing through the coil wire leading-out path without passing through a position overlapping with the outer side in the radial direction with respect to the circuit board receiving face.

20. The motor according to claim 19, wherein in the terminal block part of the coil bobbin, a front side of the pin-shaped terminal is formed to be a first inner side region which is located on the inner side in the radial direction with respect to the circuit board receiving face and structures the coil wire leading-out path, at least one of both sides of the terminal block part which are adjacent in the circumferential direction to the pin-shaped terminal is formed to be a second inner side region which is located on the inner side in the radial direction with respect to the circuit board receiving face and structures the coil wire leading-out path, the wiring circuit board is formed with land parts having a through hole at a center of the land part, in a state that the wiring circuit board is disposed on the circuit board receiving face which is formed in the terminal block part and the pin-shaped terminals are penetrated through the through holes, the first inner side region and the second inner side region are formed at positions which are located on the inner side in the radial direction with respect to the root portions of the pin-shaped terminals and the circuit board receiving face which is formed in the terminal block part, the lead-out parts of the coil wire are contacted with the pin-shaped terminals by passing through the coil wire leading-out path which is formed of the first inner side region and the second inner side region.

21. The motor according to claim 20, wherein the pin-shaped terminals and the terminal block part are integrally formed of resin, the first inner side region is formed so that a front face of the pin-shaped terminal on a side where the wound part is located is formed with a wall face which is formed in the terminal block part so as to extend toward the wound part side with respect to the circuit board receiving face and so as to continuously form a same face on the inner side in the radial direction as the front face of a root portion of the pin-shaped terminal, and the second inner side region is formed so that a wall face is formed so as to continuously form a same face on the inner side in the radial direction as a side face of the root portion of the pin-shaped terminal in at least one of both sides of the terminal block part which are adjacent in the circumferential direction to the pin-shaped terminal.

22. The motor according to claim 19, wherein in the terminal block part of the coil bobbin, a front side of the pin-shaped terminal is formed to be a first inner side region which is located on the inner side in the radial direction with respect to the circuit board receiving face and structures the coil wire leading-out path, the wiring circuit board is formed with land parts having a through hole at a center of the land part, in a state that the wiring circuit board is disposed on the circuit board receiving face which is formed in the terminal block part and the pin-shaped terminals are penetrated through the through holes, the first inner side region is formed at a position which is located on the inner side in the radial direction with respect to the root portions of the pin-shaped terminals and the circuit board receiving face which is formed in the terminal block part, and the lead-out parts of the coil wire are contacted with the pin-shaped terminals by passing through the coil wire leading-out path which is formed of the first inner side region.

23. The motor according to claim 22, wherein the pin-shaped terminals and the terminal block part are integrally formed of resin, and the first inner side region is formed so that a front face of the pin-shaped terminal on a side where the wound part is located is formed with a wall face which is formed in the terminal block part so as to extend toward the wound part side with respect to the circuit board receiving face and so as to continuously form a same face on the inner side in the radial direction as the front face of the root portion of the pin-shaped terminal.

24. The motor according to claim 19, wherein in the terminal block part of the coil bobbin, a wall face is formed so as to continuously form a same face on the inner side in the radial direction as a side face of a root portion of the pin-shaped terminal in at least one of both sides of the terminal block part which are adjacent in the circumferential direction to the pin-shaped terminal, the wall face forms a second inner side region which is located on the inner side in the radial direction with respect to the circuit board receiving face and structures the coil wire leading-out path, the wiring circuit board is formed with land parts having a through hole at a center of the land part, in a state that the wiring circuit board is disposed on the circuit board receiving face which is formed in the terminal block part and the pin-shaped terminals are penetrated through the through holes, the second inner side region is formed at a position which is located on the inner side in the radial direction with respect to the root portions of the pin-shaped terminals and the circuit board receiving face which is formed in the terminal block part, and the lead-out parts of the coil wire are contacted with the pin-shaped terminals by passing through the coil wire leading-out path which is formed of the second inner side region.

* * * * *